(12) United States Patent
Bevirt et al.

(10) Patent No.: US 12,497,158 B2
(45) Date of Patent: Dec. 16, 2025

(54) VTOL AIRCRAFT WITH DUAL PROPELLERS AND DIRECTIONAL CLUTCH

(71) Applicant: JOBY AERO, INC., Santa Cruz, CA (US)

(72) Inventors: Joeben Bevirt, Santa Cruz (CA); Alex Stoll, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 24 days.

(21) Appl. No.: 18/401,316

(22) Filed: Dec. 29, 2023

(65) Prior Publication Data

US 2025/0019082 A1 Jan. 16, 2025

Related U.S. Application Data

(63) Continuation of application No. 18/097,497, filed on Jan. 17, 2023, now Pat. No. 11,919,652, which is a continuation of application No. 17/388,262, filed on Jul. 29, 2021, now Pat. No. 11,613,370, which is a continuation of application No. 16/815,006, filed on Mar. 11, 2020, now Pat. No. 11,273,922, which is a continuation of application No. 16/596,497, filed on Oct. 8, 2019, now Pat. No. 10,994,851, which is a continuation of application No. 15/641,129, filed on Jul. 3, 2017, now Pat. No. 10,556,700, which is a continuation of application No. 14/218,845, filed on Mar. 18, 2014, now Pat. No. 9,694,911.

(51) Int. Cl.
| | |
|---|---|
| *B64C 11/28* | (2006.01) |
| *B64C 29/00* | (2006.01) |
| *B64C 39/06* | (2006.01) |
| *B64D 27/31* | (2024.01) |
| *B64D 27/34* | (2024.01) |
| *B64D 27/357* | (2024.01) |

(52) U.S. Cl.
CPC .......... *B64C 11/28* (2013.01); *B64C 29/0033* (2013.01); *B64C 39/068* (2013.01); *B64D 27/31* (2024.01); *B64D 27/34* (2024.01); *B64D 27/357* (2024.01); *Y02T 50/60* (2013.01)

(58) Field of Classification Search
CPC ...... B64D 27/24; B64D 27/34; B64D 27/357; B64D 27/31; B64C 11/28; B64C 29/0033; B64C 39/068; Y02T 50/60
See application file for complete search history.

(56) References Cited

U.S. PATENT DOCUMENTS

2021/0347472 A1* 11/2021 Karem ................ B64C 11/305
2022/0258873 A1* 8/2022 Bernard .............. B60L 3/0061

* cited by examiner

*Primary Examiner* — Alentina Xavier
(74) *Attorney, Agent, or Firm* — Michael A. Guth

(57) ABSTRACT

An aerial vehicle adapted for vertical takeoff and landing using a set of wing mounted thrust producing elements for takeoff and landing. An aerial vehicle which is adapted to vertical takeoff with the rotors in a rotated, take-off attitude then transitions to a horizontal flight path, with the rotors rotated to a typical horizontal configuration. The aerial vehicle may have deployment mechanisms which deploy electric motor driven propellers from a forward facing to a vertical orientation. The deployment mechanisms deploy the rotor forward and up as they deploy from a forward flight configuration to a vertical thrust configuration. A single motor may drive two co-axial propellers, with a first propeller driven when the motor spins in a first direction, and a second propeller driven when the motor spins in a second direction.

9 Claims, 30 Drawing Sheets

400

VTOL AIRCRAFT WITH DUAL PROPELLERS AND DIRECTIONAL CLUTCH

CROSS-REFERENCE TO RELATED APPLICATIONS

This application is a continuation of U.S. patent application Ser. No. 18/097,497 to Bevirt et al., filed Jan. 17, 2023, which is a continuation of U.S. patent application Ser. No. 17/388,262 to Bevirt et al., filed Jul. 29, 2021, now U.S. Pat. No. 11,613,370, which is a continuation of U.S. patent application Ser. No. 16/815,006 to Bevirt et al., filed Mar. 11, 2020, now U.S. Pat. No. 11,273,922, which is a continuation of U.S. patent application Ser. No. 16/596,497 to Bevirt et al., filed Oct. 8, 2019, which is a continuation of U.S. patent application Ser. No. 15/641,129 to Bevirt et al., filed Jul. 3, 2017, now U.S. Pat. No. 10,556,700, which is a continuation of U.S. patent application Ser. No. 14/218,845 to Bevirt et al., filed Mar. 18, 2014, now U.S. Pat. No. 9,694,911, which are all hereby incorporated by reference in their entirety.

BACKGROUND

Field of the Invention

This invention relates to powered flight, and more specifically to a vertical take-off and landing aircraft with pivoting rotors and stowing rotor blades.

Description of Related Art

There are generally three types of vertical takeoff and landing (VTOL) configurations: wing type configurations having a fuselage with rotatable wings and engines or fixed wings with vectored thrust engines for vertical and horizontal translational flight; helicopter type configuration having a fuselage with a rotor mounted above which provides lift and thrust; and ducted type configurations having a fuselage with a ducted rotor system which provides translational flight as well as vertical takeoff and landing capabilities.

The amount of thrust required to take-off in a vertical take-off scenario greatly exceeds the thrust needed to keep the same vehicle aloft during forward flight, when the wings are providing lift. The amount of thrust required to transition from a vertical take-off mode to horizontal, forward, flight mode may also be quite high. Thus, there may be a mismatch between the power requirements if there are not possibilities to change power delivery paradigms during flight.

In order to provide efficiency in both vertical take-off and forward flight modes, improvements to past systems must be made. What is called for is a vertical take-off and landing aircraft that incorporates efficiencies into all use modes.

SUMMARY

An aerial vehicle adapted for vertical takeoff and landing using a set of wing mounted thrust producing elements and a set of tail mounted rotors for takeoff and landing. An aerial vehicle which is adapted to vertical takeoff with the rotors in a rotated, take-off attitude then transitions to a horizontal flight path, with the rotors rotated to a typical horizontal configuration. The aerial vehicle uses different configurations of its wing mounted rotors and propellers to reduce drag in all flight modes.

DETAILED DESCRIPTION

Figure 1:
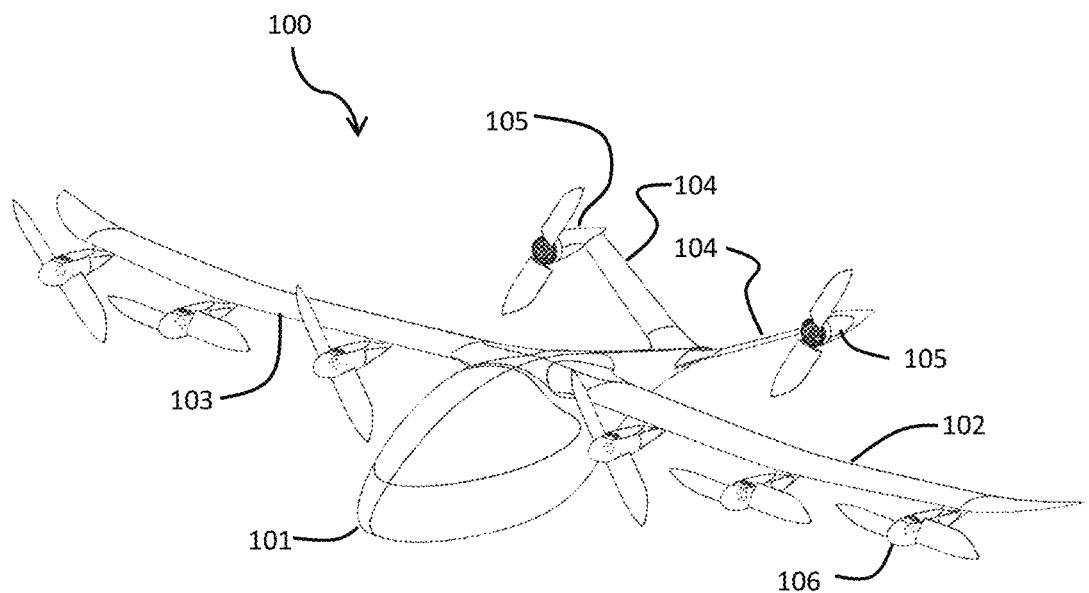
FIG. 1 is a perspective view of an aerial vehicle in forward flight according to a first embodiment of the present invention.

Although vertical takeoff and landing (VTOL) aircraft have always been desired, compromises in the realization of these aircraft have limited their usefulness and adoption to certain niches. The thrust needed for VTOL is significantly higher than the thrust needed to maintain horizontal flight. The vertical take-off thrust may also be needed during the transition to forward flight. Once moving in forward flight, the wings of the aircraft provide lift, supplanting a function delivered by motors during VTOL and during transition. Thrust producing elements needed during take-off, but not during forward flight, may be altered during forward flight such that they impart less drag onto the flying system.

In some aspects, an aerial vehicle may use bladed propellers powered by electric motors to provide thrust during take-off. The propeller/motor units may be referred to as rotor assemblies. In some aspects, the wings of the aerial vehicle may rotate, with the leading edges facing upwards, such that the propellers provide vertical thrust for take-off and landing. In some aspects, the motor driven propeller units on the wings may themselves rotate relative to a fixed wing, such that the propellers provide vertical thrust for take-off and landing. The rotation of the motor driven propeller units may allow for directional change of thrust by rotating both the propeller and the electric motor, thus not requiring any gimbaling, or other method, of torque drive around or through a rotating joint.

In some aspects, some or all of the wing mounted motor driven rotors are adapted to have the rotor blades fold back into a stowed position wherein the blades nest in recesses in the adjoining nacelle body after a transition to horizontal flight. The nested blades may result in a significantly lower drag of the aerial vehicle, while also allowing a significantly reduced power usage with only some of the rotors providing forward thrust.

In some aspects, extended nacelles with two coaxial propellers are used such that one of the propellers is used during forward flight, and another during vertical take-off and landing. The VTOL propeller may be adapted to nest its blades during forward flight. In some aspects, the extended nacelle may reside at the tip of a wing, or at the end of a rear V-tail element, and be adapted to rotate such that the VTOL propeller may provide vertical thrust during take-off and landing. In some aspects, each of the coaxial propellers has its own electric motor. In some aspects, the coaxial propellers are driven by the same electric motor. In some aspects, the electric motor has directional clutches such that one propeller is driven while the motor rotates in a first direction, and the other propeller is driven while the motor rotates in a second direction.

In some aspects, the motor driven rotors attached to the wing are adapted to place the mass of the motor and rotor significantly forward of the wing. In some aspects, this forward location allows for the rotation of the rotors to a vertical thrust orientation that has the airflow predominantly in front of the leading edge of the wing, reducing air flow impingement by the wing during VTOL operations. In some aspects, this forward location of the mass of the rotors and motors allows for unusual wing configurations, such as swept forward wings, whose otherwise possible drawbacks during higher g-force maneuvers are partially or fully moderated by this mass placement.

In some aspects, the mass balance of the aerial vehicle may be altered by movement of masses such as the battery mass. In some aspects, the battery mass may be adjusted to retain balance when a single vs. a multi-passenger load is supported. In some aspects, mass balance may be adjusted in automatic response to sensors within the aerial vehicle. In some aspects, the battery mass may be distributed between a two or more battery packs. The battery packs may be mounted such that their position may be changed during flight in response to changes in the balance of the aerial vehicle. In some aspects, the flight control system of the aerial vehicle may sense differential thrust requirements during vertical take-off and landing, and may move the battery mass in order to achieve a more balanced thrust distribution across the rotor assemblies. In some aspects, the battery mass may be moved should there be a failure of a rotor assembly during transition or vertical take-off and landing, again to balance the thrust demands of the various remaining functioning rotors.

In a first embodiment of the present invention, as seen in FIGS. 1-4, an aerial vehicle 100 is seen in first forward flight configuration, as would be seen just after having transitioned from a vertical take-off configuration. In another forward flight mode, the blades of the wing mounted rotors will stow and nest, as discussed below. The aircraft body 101 supports a left wing 102 and a right wing 103. Motor driven rotor units 106 include propellers 107 which may stow and nest into the nacelle body. The aircraft body 101 extends rearward is also attached to raised rear stabilizers 104. The rear stabilizers have rear motors 105 attached thereto. In some aspects, the rear motors may also have front hubs, or spinners, which are omitted from some Figures for illustrative purposes.

Figure 2:
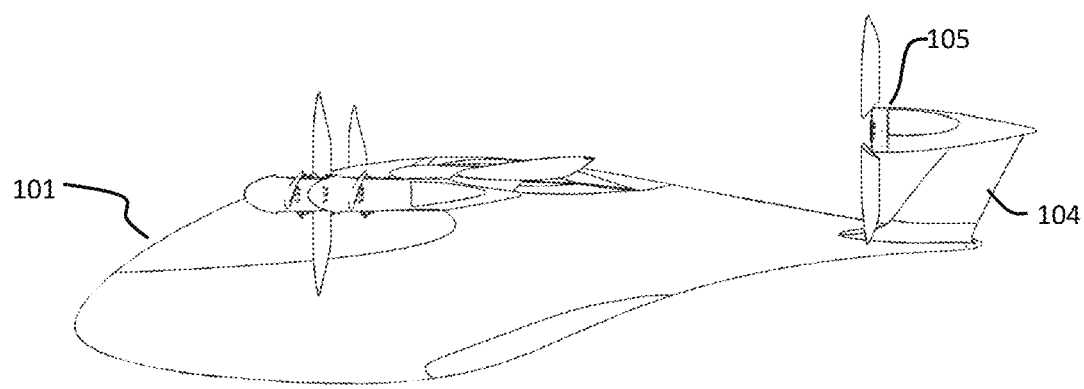
FIG. 2 is a side view of an aerial vehicle in a forward flight configuration according to a first embodiment of the present invention.
Figure 3:
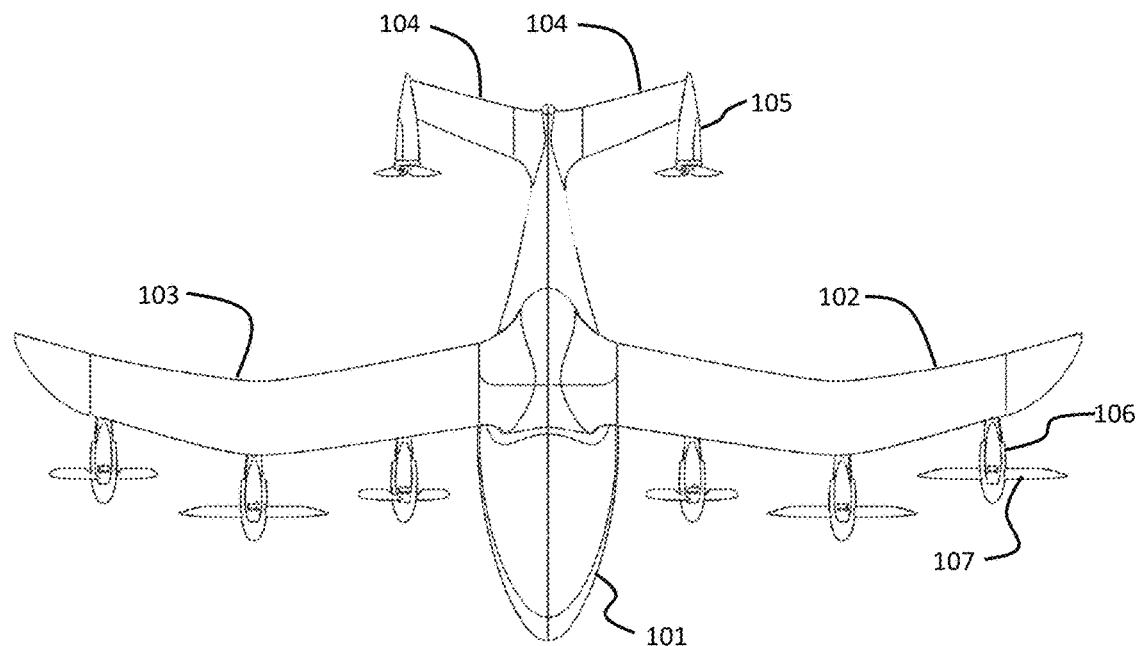
FIG. 3 is a top view of an aerial vehicle in a forward flight configuration according to a first embodiment of the present invention.
Figure 4:
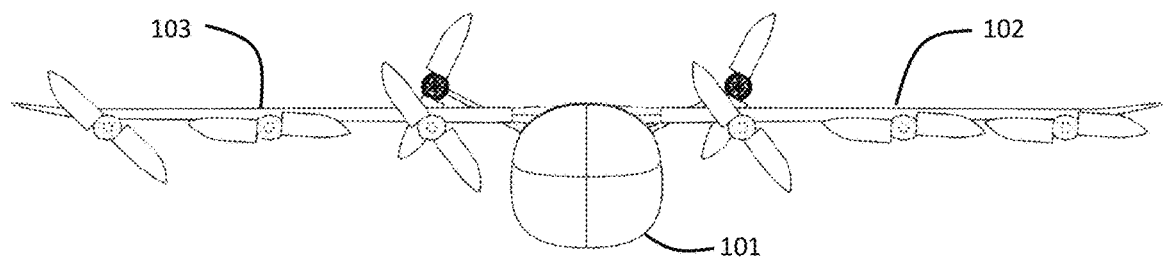
FIG. 4 is a front view of an aerial vehicle in a forward flight configuration according to a first embodiment of the present invention.

As seen in top view in FIG. 3, the wings 102, 103 are partially swept forward. Aerial vehicles according to embodiments of the present invention may include partially or wholly forward swept wings with spanwise distributed masses located forward of the leading edge. The divergent aeroelastic torsion commonly seen in forward-swept wing designs is substantially reduced by the presence of the masses cantilevered forward of the wing, which create opposing torque. As seen in FIGS. 2 and 3, the wing rotor assemblies 106 are mounted forward of the wing leading edge, and are also then forward of the neutral axis of the wing.

Figure 5:
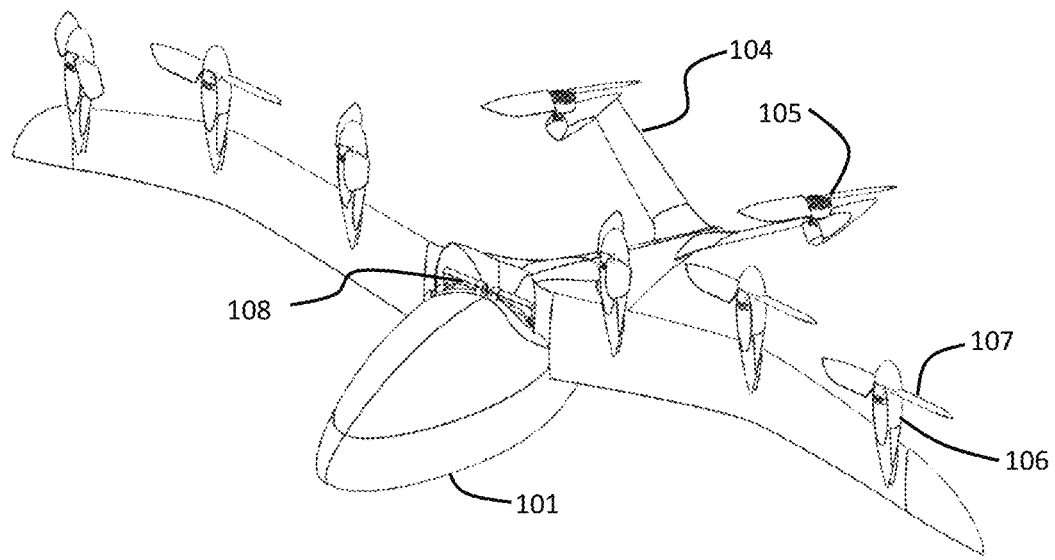
FIG. 5 is a perspective view of an aerial vehicle in takeoff configuration according to a first embodiment of the present invention.
Figure 6:
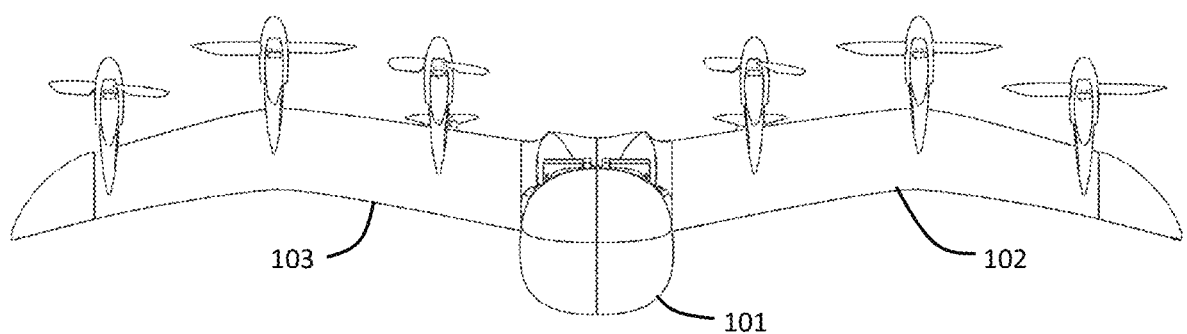
FIG. 6 is a front view of an aerial vehicle in takeoff configuration according to a first embodiment of the present invention.
Figure 7:
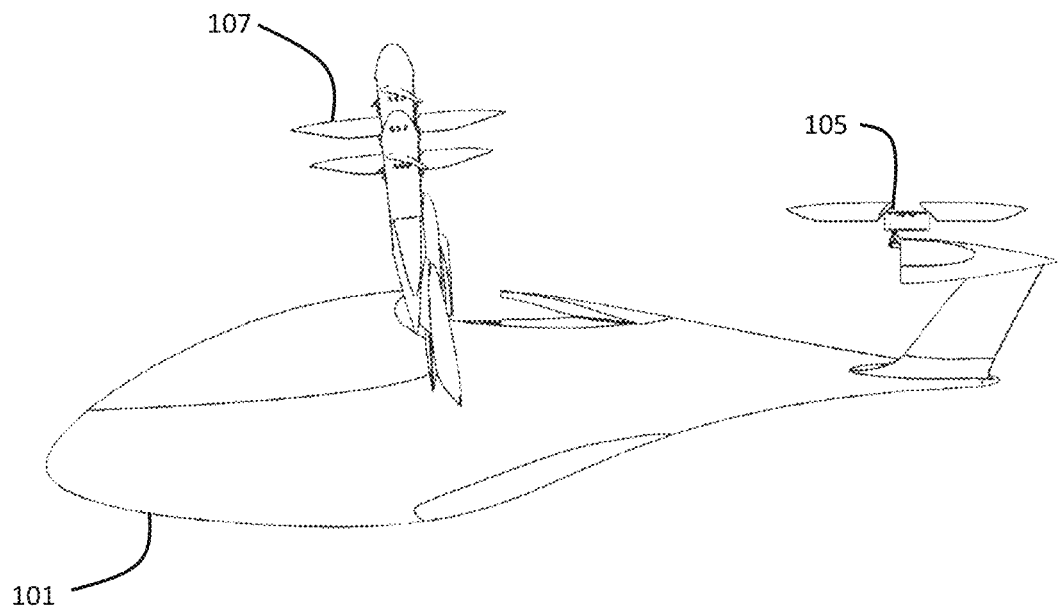
FIG. 7 is a side view of an aerial vehicle in takeoff configuration according to a first embodiment of the present invention.
Figure 8:
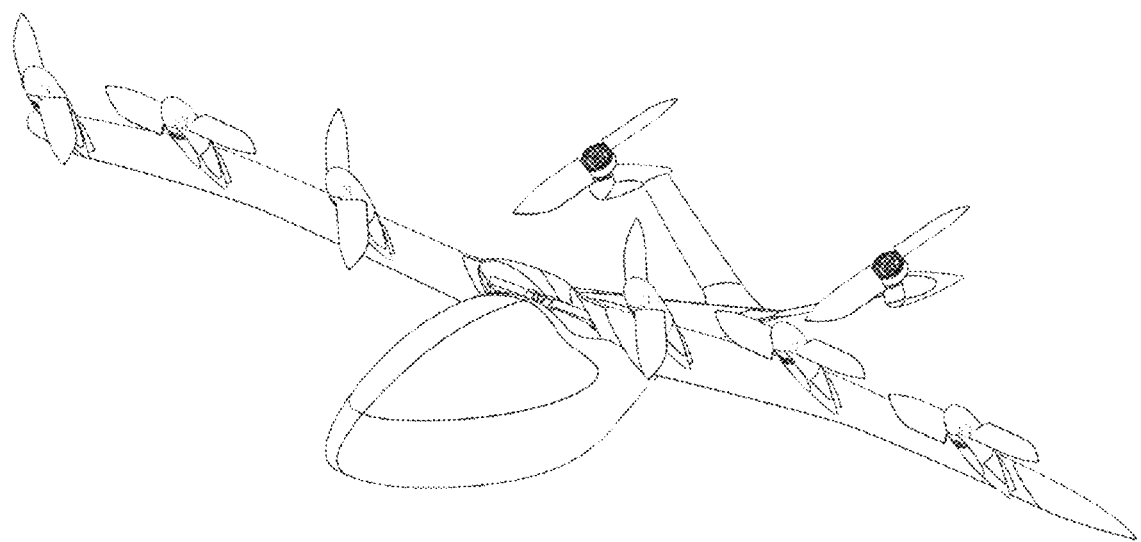
FIG. 8 is a perspective view of an aerial vehicle in a transition configuration according to a first embodiment of the present invention.

FIGS. 5-7 illustrate the aerial vehicle 100 in a vertical take-off and landing configuration such that the thrust of the rotors is directed upward. The wing 102, 103 have been rotated relative to the body 101 around a pivot 108. In some embodiments, the wings are fixed to each other with structure that crosses through the vehicle body 101. As seen in side view in FIG. 7, whereas the wing rotors 107 have had their thrust redirected for vertical take-off due to the rotation of the wing, the rear rotors 105 have had their thrust redirected due to their rotation relative to the rear stabilizers 104. Although referred to above as a pivot, the attachment of the wing to the aerial vehicle body may use a linkage adapted to maintain a forward position of the mass of the wing and rotor assemblies.

Figure 22:
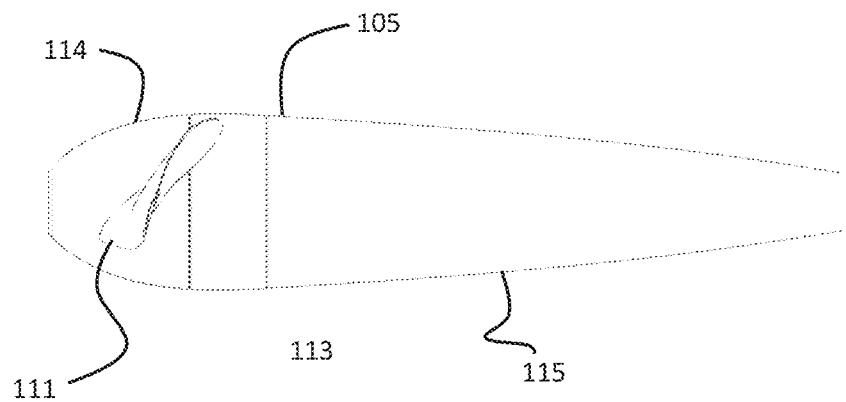
FIG. 22 is a side view of a tail rotor in a forward flight configuration according to some embodiments of the present invention.
Figure 23:
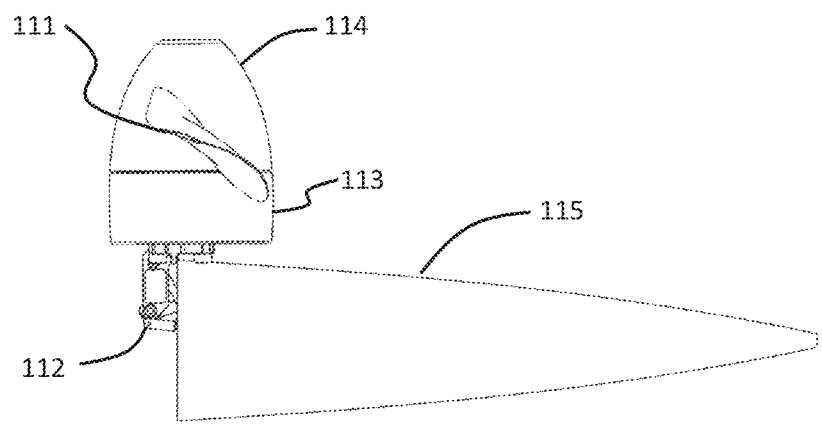
FIG. 23 is a side view of a tail rotor in a take-off configuration to some embodiments of the present invention.
Figure 24:
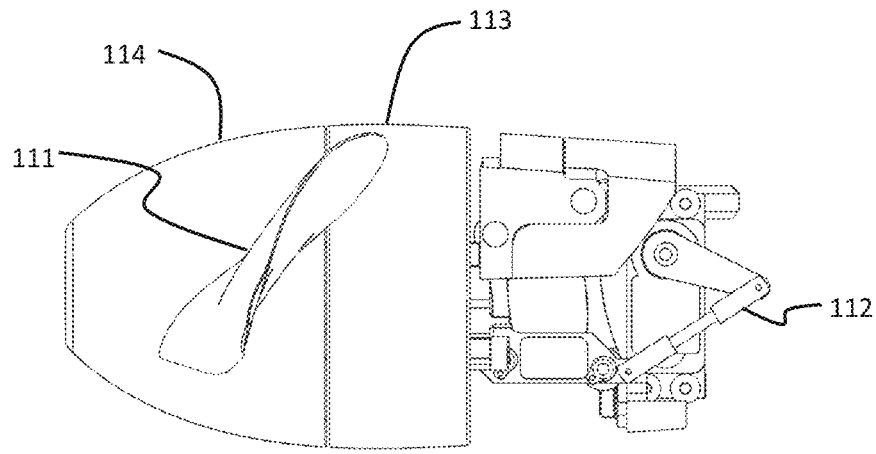
FIG. 24 is a side view of a tail rotor and its deployment mechanism in a stowed configuration according to some embodiments of the present invention.
Figure 25:
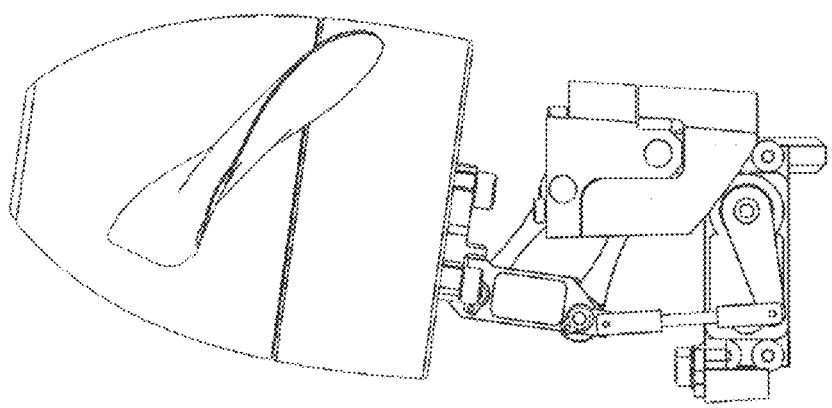
FIG. 25 is a side view of a tail rotor and its deployment mechanism moving from a stowed configuration according to some embodiments of the present invention.

FIGS. 21-28 illustrate the configurations of the rear rotor. The deployment of a rear rotor from a stowed, forward flight, configuration to a deployed, vertical take-off, position, as well as a variety of intervening positions, may be achieved using a deployment mechanism which rotates the rotor relative to the rear stabilizers. FIG. 22 illustrates a stowed, forward flight, configuration of rear rotor unit 105. The rear nacelle portion 115 may be rigidly mounted to a rear stabilizer in some embodiments. The spinner 114 and the motor cover 113 provide aerodynamic surfaces for the front portion of the nacelle. The propeller 111 extends through the spinner 114. In a fully deployed position, as seen in FIG. 23, and in a partial front view in FIG. 28, the motor 110, motor cover 113, spinner 114, and propeller 111 have rotated to a position adapted to provide vertical thrust. The electric motor/propeller combination being on the outboard side of the articulating joint allows for a rigid mounting of the propeller to the motor, which is maintained even as the propeller is moved through various attitudes relative to the rear nacelle portion. With such a configuration the rotating power from the motor need not be gimbaled or otherwise transferred across a rotating joint.

Figure 26:
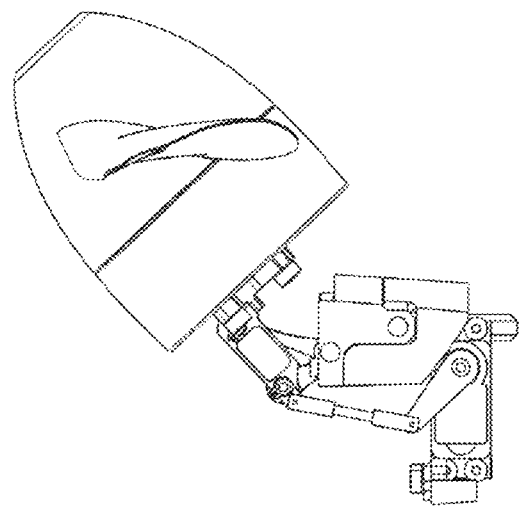
FIG. 26 is a side view of a tail rotor and its deployment mechanism moving from a stowed configuration according to some embodiments of the present invention.
Figure 27:
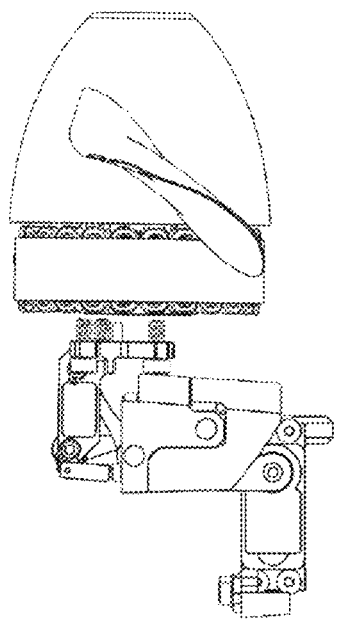
FIG. 27 is a side view of a tail rotor and its deployment mechanism in a deployed configuration according to some embodiments of the present invention.
Figure 28:
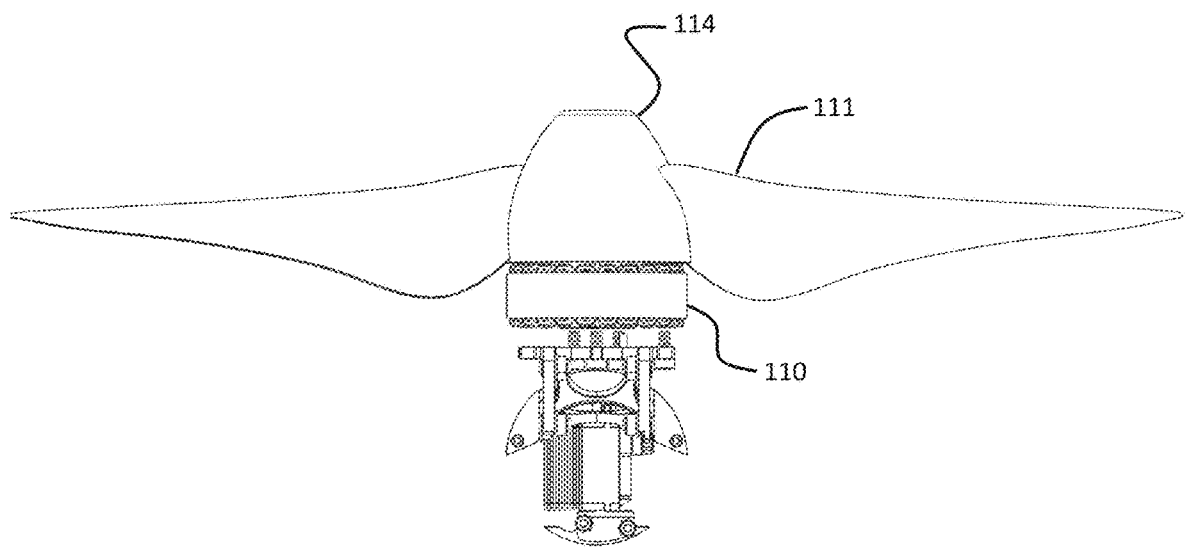
FIG. 28 is a front view of a tail rotor and its deployment mechanism in a deployed configuration according to some embodiments of the present invention.
Figure 29:
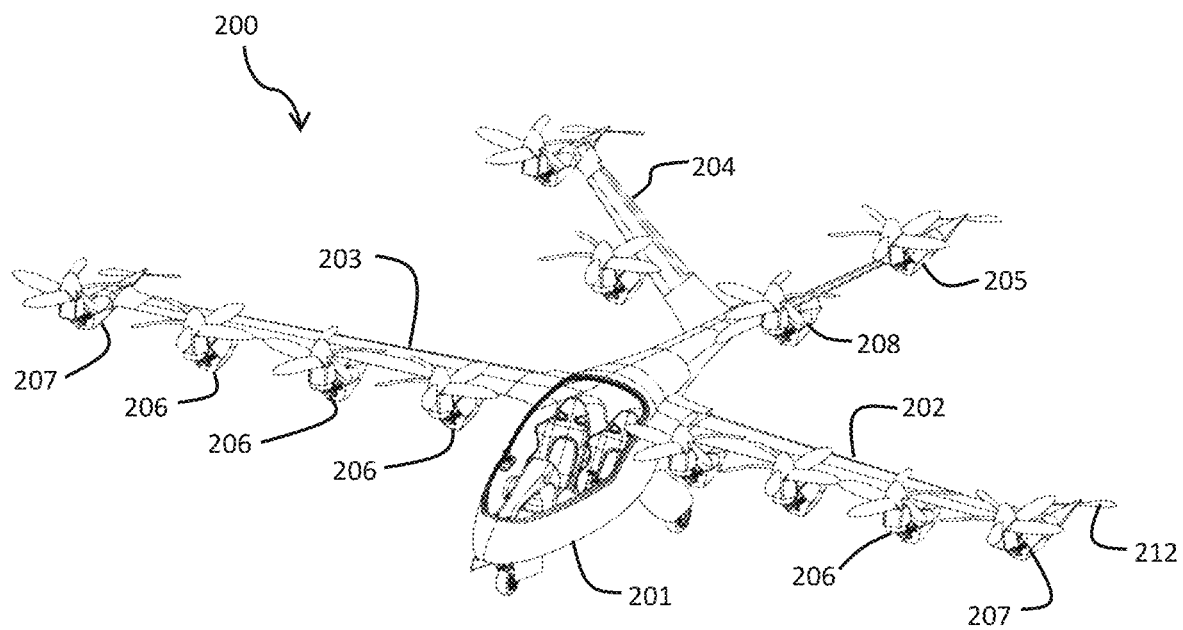
FIG. 29 is a perspective view of an aerial vehicle in take-off configuration according to a second embodiment of the present invention.
Figure 30:
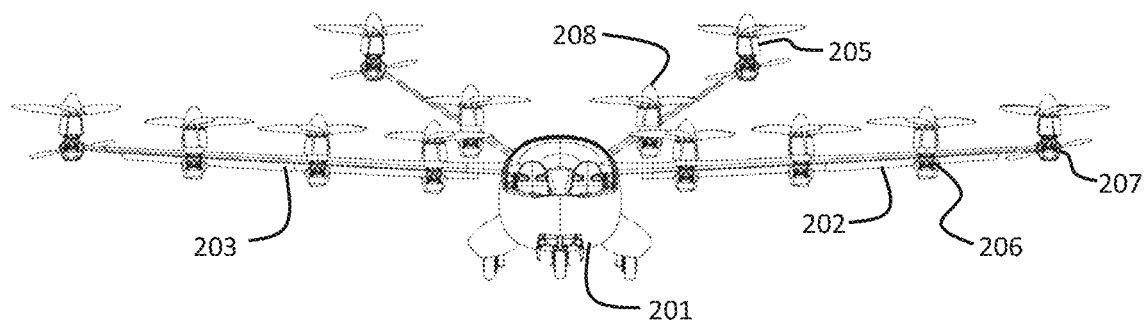
FIG. 30 is a front view of an aerial vehicle in take-off configuration according to a second embodiment of the present invention.
Figure 31:
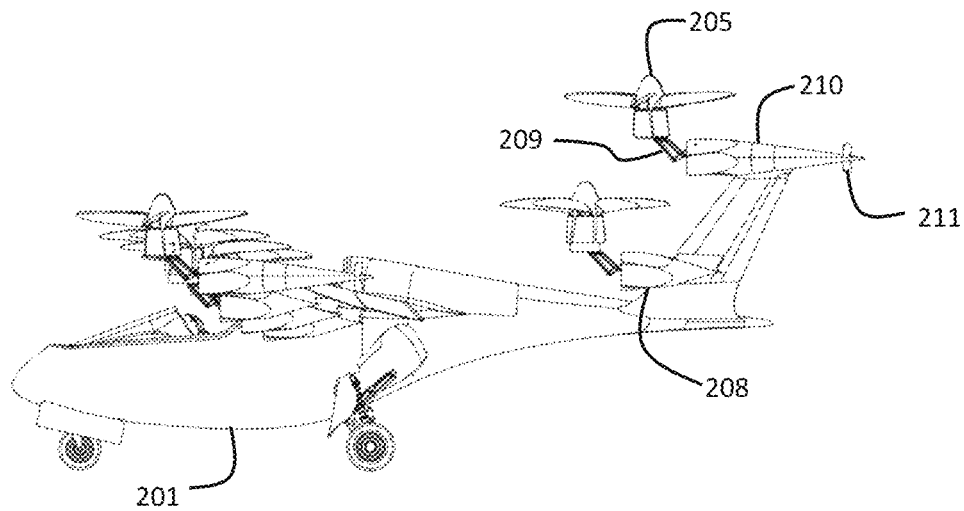
FIG. 31 is a side view of an aerial vehicle in take-off configuration according to a second embodiment of the present invention.

FIGS. 24-27 illustrate a sequence of positions of the motor and propeller relative to the rear nacelle, also to the rear tail structure of the aerial vehicle. As the articulating portion of the rear rotor unit begins its deployment, it can be seen in FIG. 25 that the linkages first deploy the articulating portion forward, as opposed to merely pivoting around a single pivot point. The multi-bar linkage allows for the use of a single actuator for this complex deployment. FIG. 26 illustrates the rear rotor unit as it does rise above the top of the rear nacelle, and achieves full deployment as seen in FIG. 27. With the multi-bar linkage the motion of the articulating portion, which includes the motor, propeller, and spinner, is almost horizontal at the position of full deployment. As the thrust direction of the rotor is vertical in the fully deployed position, the actuator powering the deployment of the multi-bar linkage is not required to offset, or counteract, the thrust of the rotor.

Figure 9:
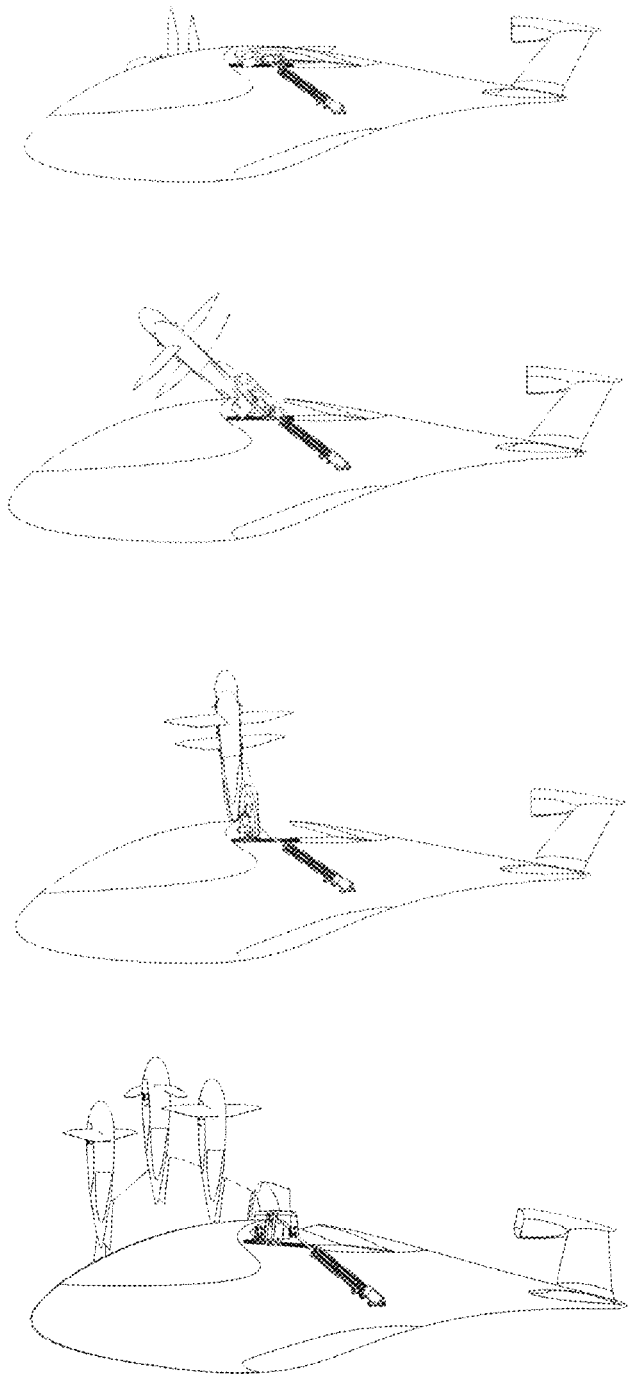
FIG. 9 is a sequence of views illustrating transition of the wing according to a first embodiment of the present invention.
Figure 10:
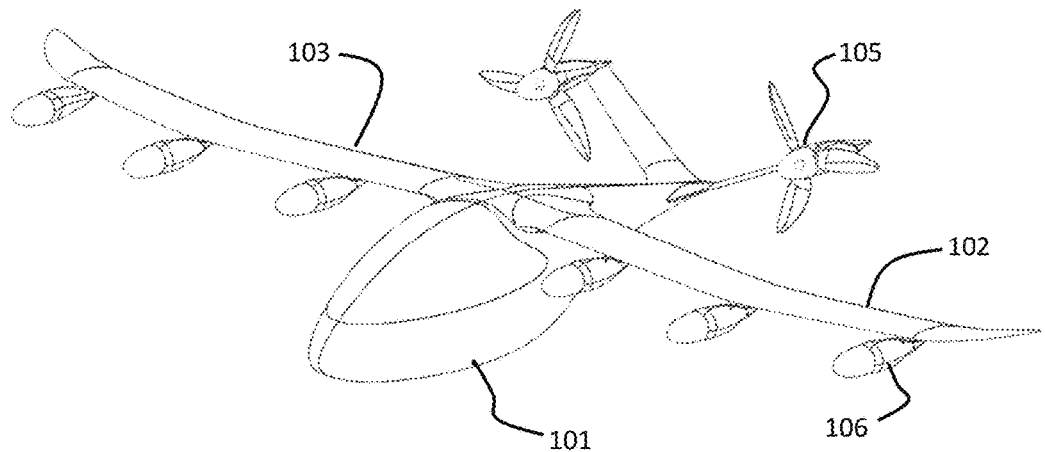
FIG. 10 is a perspective view of an aerial vehicle in forward flight with wing rotor blades stowed according to a first embodiment of the present invention.
Figure 11:
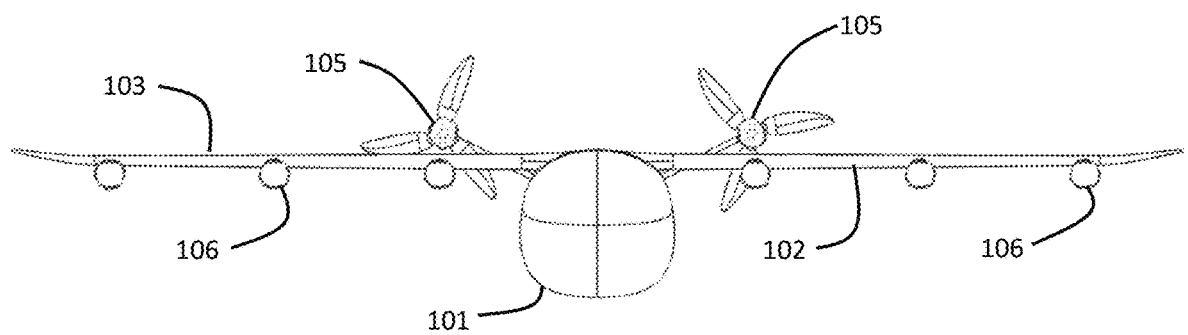
FIG. 11 is a front view of an aerial vehicle in a forward flight configuration with wing rotor blades stowed according to a first embodiment of the present invention.
Figure 12:
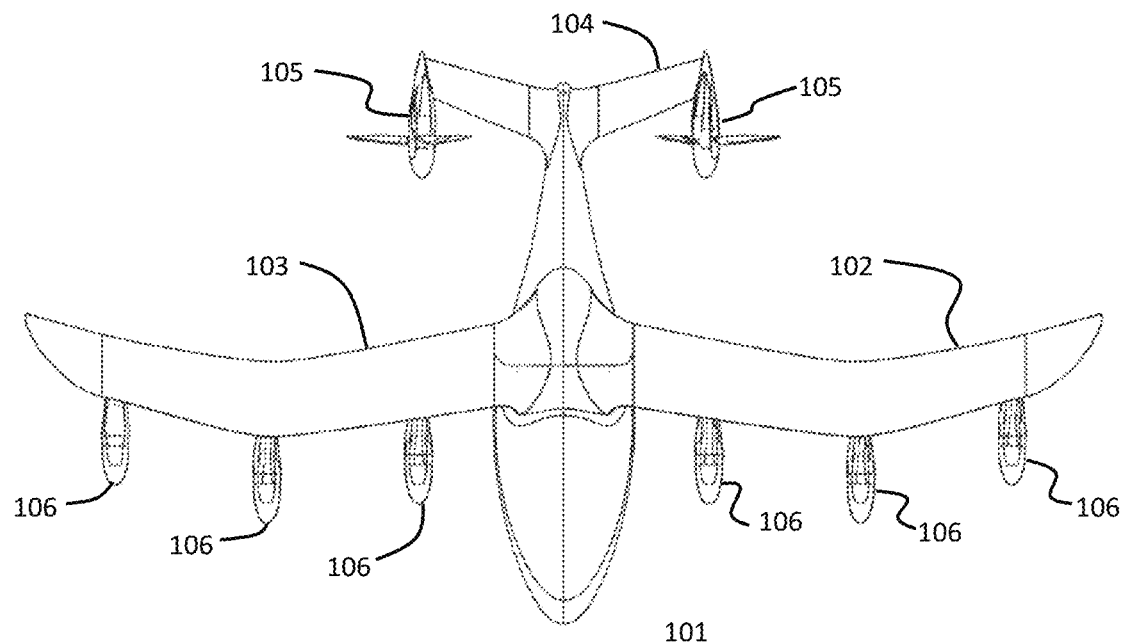
FIG. 12 is a top view of an aerial vehicle in a forward flight configuration with wing rotor blades stowed according to a first embodiment of the present invention.
Figure 13:
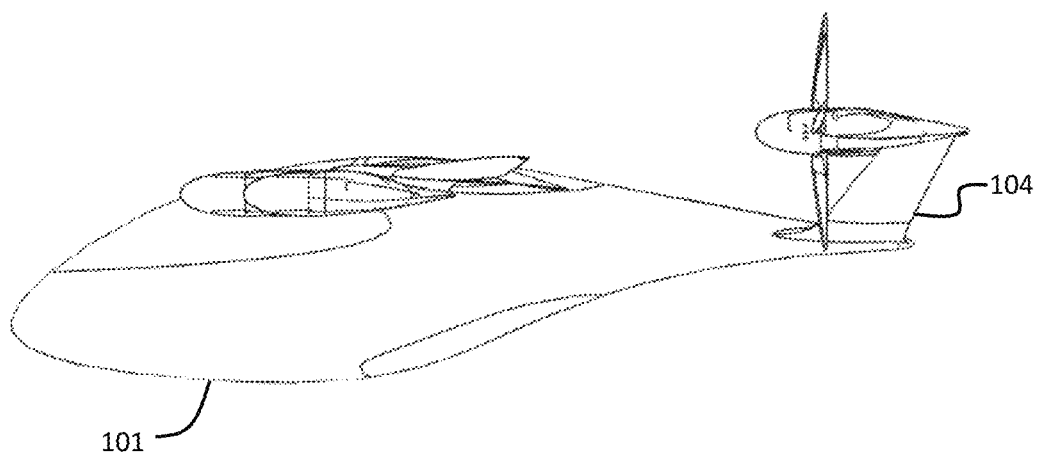
FIG. 13 is a side view of an aerial vehicle in a forward flight configuration with wing rotor blades stowed according to a first embodiment of the present invention.

FIG. 9 illustrates various positions of the wing and rear rotors as would be seen during transition from take-off to forward flight mode, or from forward flight mode to vertical take-off and landing mode. After a vertical take-off, the rotors transition from a configuration providing vertical thrust through positions rotating towards the horizontal. As the forward speed of the aerial vehicle increases, the wings begin to generate lift such that not as much vertical thrust is needed to maintain altitude. With sufficient forward speed, lift is maintained by the wings and the thrust needed for forward flight is able to be provided by fewer rotors. In some aspects, the wings are raised to a vertical take-off configuration with the use of a linkage adapted to slide the wing pivot forward as the wing reaches deployment. This allows for a more favorable compromise in center of gravity location between VTOL and forward flight modes by locating the wing-mounted rotor assemblies farther forward in the VTOL configuration.

FIGS. 10-13 illustrate a forward flight configuration of the aerial vehicle 100 according to some embodiment of the present invention. The propeller blades of the wing mounted rotors 106 have been stowed and are nested within recesses along the nacelle. As forward flight requires significantly less thrust than required for vertical take-off, many of the individual motors and rotors may be deactivated during forward flight. To reduce drag, the blades may be folded back into a stowed position. To further reduce drag, the nacelles may have recesses such that the folded blades are adapted to nest within the recesses, creating a very low drag nacelle during forward flight. The rear rotors 105 may be used to provide forward thrust during this forward flight configuration.

Figure 14:
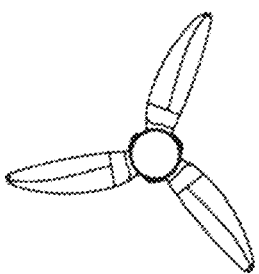
FIG. 14 is a perspective view of a wing rotor with the front cover removed for clarity according to some embodiments of the present invention.
Figure 14:
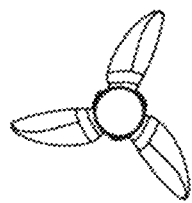
Figure 14:
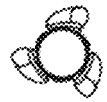
Figure 14:
Figure 15:
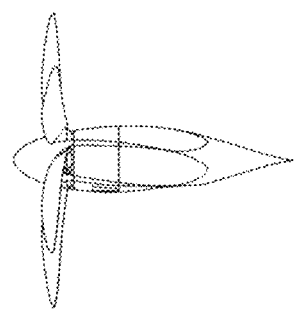
FIG. 15 is a front view of a wing rotor with the front cover removed for clarity according to some embodiments of the present invention.
Figure 15:
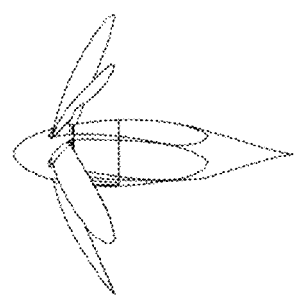
Figure 15:
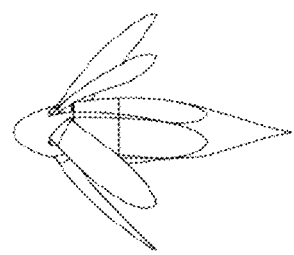
Figure 15:
Figure 15:
Figure 38:
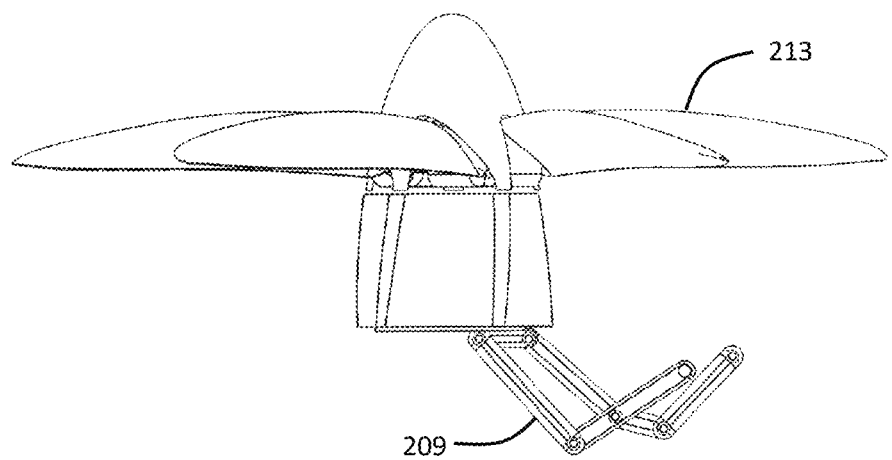
FIG. 38 is a side view of a deployed rotor unit with rotor blades extended according to some embodiments of the present invention.

FIG. 14 illustrates a front set of views of a stowing blade set as it stows from a fully deployed configuration to a fully stowed configuration. The blades nest into recesses along the nacelle such that the stowed blade set gives the effective wetted area of a simple nacelle. FIG. 15 illustrates a wing mounted rotor unit according to some embodiments as it stows from a fully deployed configuration to a stowed configuration. Of note is that the rotor assembly, which may comprise an electric motor, the blade set, and the spinner, may itself deploy as a whole as seen in FIG. 38, for example. In some aspects, the deployment of the rotor assembly utilizes a linkage, such as the linkage 209 of FIG. 38, which deploys the rotor to a vertical position while simultaneously pushing it forward and away from the remaining body of the nacelle. The push away from the remaining body of the nacelle reduces the download in the wing from the downwash of the associated rotor.

Figure 16:
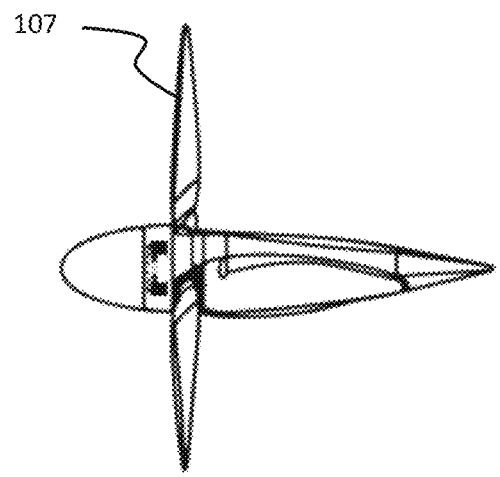
FIG. 16 is a side view of a wing rotor with its blades deployed according to some embodiments of the present invention.
Figure 17:
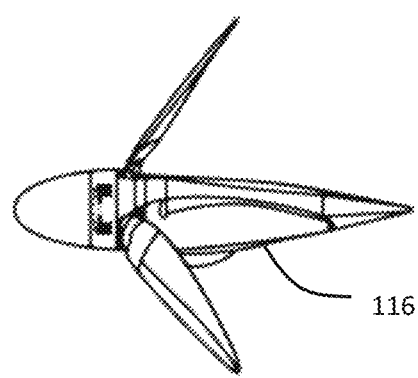
FIG. 17 is a side view of a wing rotor with its blades stowing according to some embodiments of the present invention.
Figure 18:
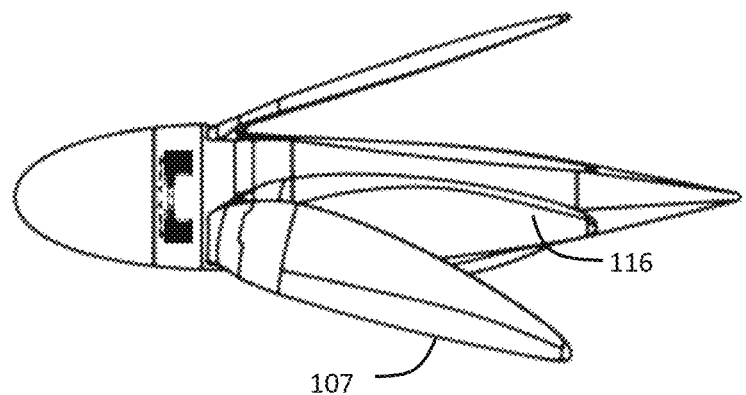
FIG. 18 is a side view of a wing rotor with its blades stowing according to some embodiments of the present invention.
Figure 19:
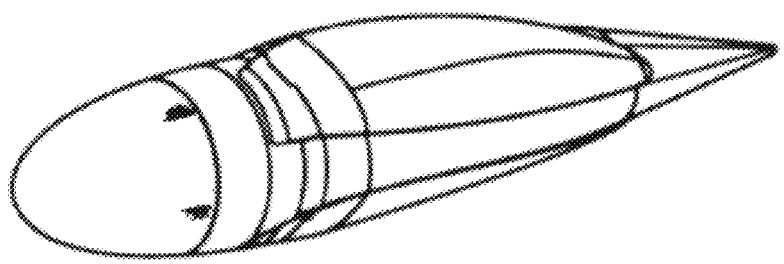
FIG. 19 is a side view of a wing rotor with its blades stowing according to some embodiments of the present invention.
Figure 20:
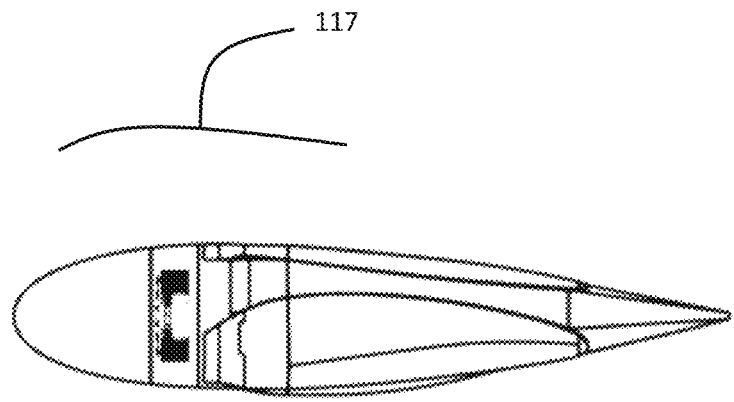
FIG. 20 is a side view of a wing rotor with its blades stowed according to some embodiments of the present invention.
Figure 21:
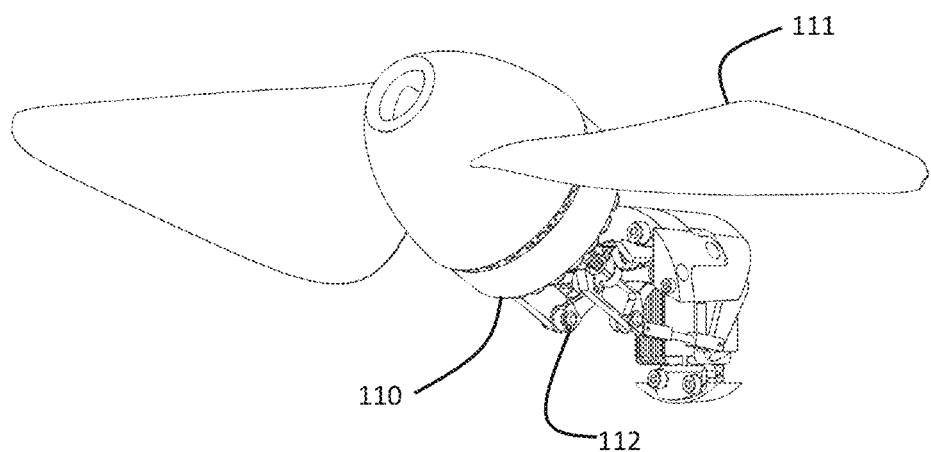
FIG. 21 is a perspective view of a tail rotor according to some embodiments of the present invention.

FIGS. 16-20 illustrate a sequence of positions as the blades 107 of a wing mounted rotor 106 fold down into a stowed position. FIG. 16 illustrates the propeller blades 107 fully deployed, as would be used in vertical take-off and landing, and during transition to horizontal, forward, flight. Thus succeeding figures illustrate the blades 107 folding down to a stowed position. As seen in FIG. 20, the blades 107 fit within recesses 116 in the nacelle resulting in a low drag configuration 117.

In an exemplary configuration of the first embodiment, the aerial vehicle has 8 rotors and weighs 900 kg. The rotor diameters are 1.3 meters, with a thrust per rotor of 1100 N. The continuous rpm of the motor at sea level is 1570 rpm, with a maximum of 1920 rpm. The wingspan is 8.5 meters. The battery mass is 320 kg, and the mass per motor is 20 kg. The cruise speed is 320 km/h. The continuous hover shaft power per motor is 29 kW.

In a second embodiment of the present invention, as seen in a vertical take-off configuration in FIGS. 29-32, an aerial vehicle 200 uses forward swept fixed wings 202, 203 with rotors of different types adapted for both vertical take-off and landing and for forward flight. The aircraft body 201 supports a left wing 202 and a right wing 203. Motor driven rotor assemblies 206, 207 on the wings include propellers which may stow and nest into the nacelle body. The aircraft body 201 extends rearward is also attached to raised rear stabilizers 204. The rear stabilizers have rear rotor assemblies 205, 208 attached thereto. The aerial vehicle 200 is seen with two passenger seats side by side, as well as landing gear under the body 201. Although two passenger seats are illustrated, other numbers of passengers may be accommodated in differing embodiments of the present invention.

Figure 32:
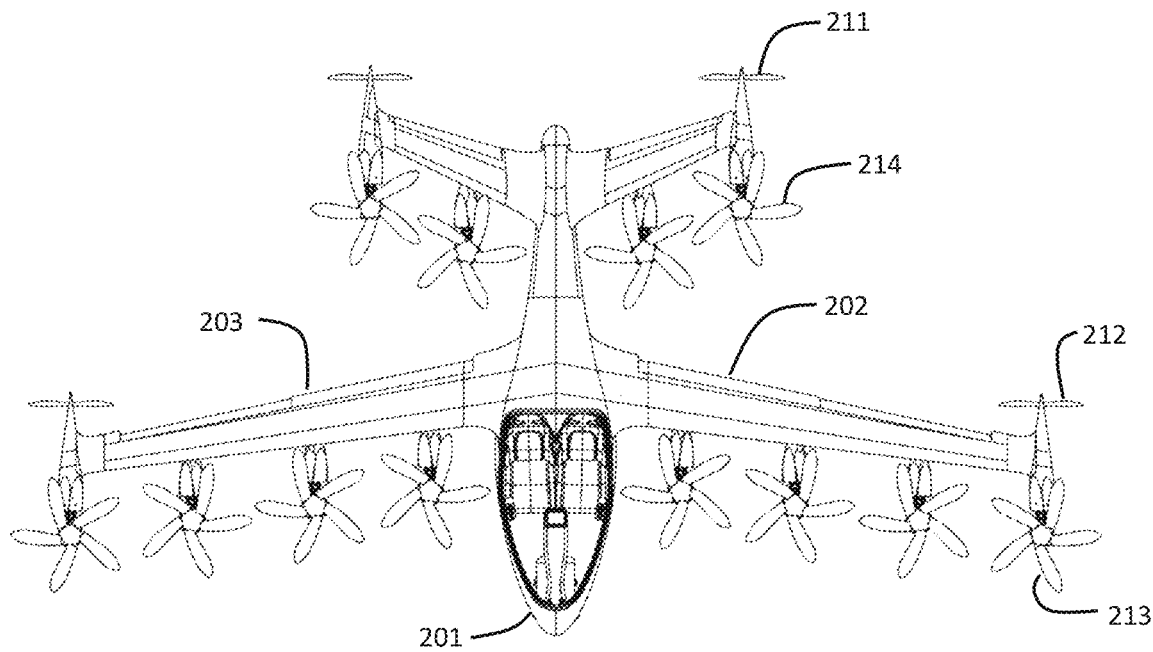
FIG. 32 is a top view of an aerial vehicle in take-off configuration according to a second embodiment of the present invention.
Figure 33:
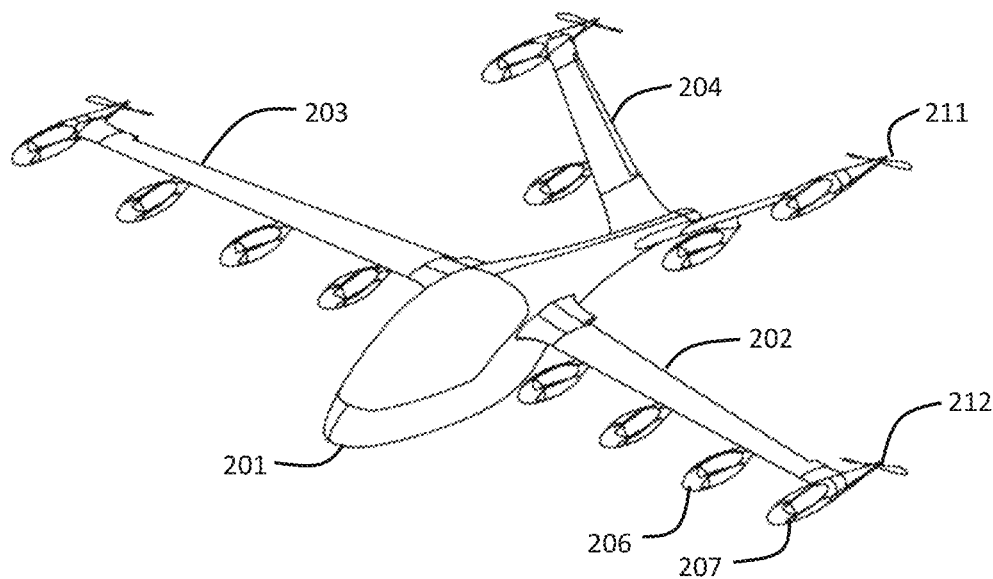
FIG. 33 is a perspective view of an aerial vehicle in a forward flight configuration according to a second embodiment of the present invention.
Figure 34:
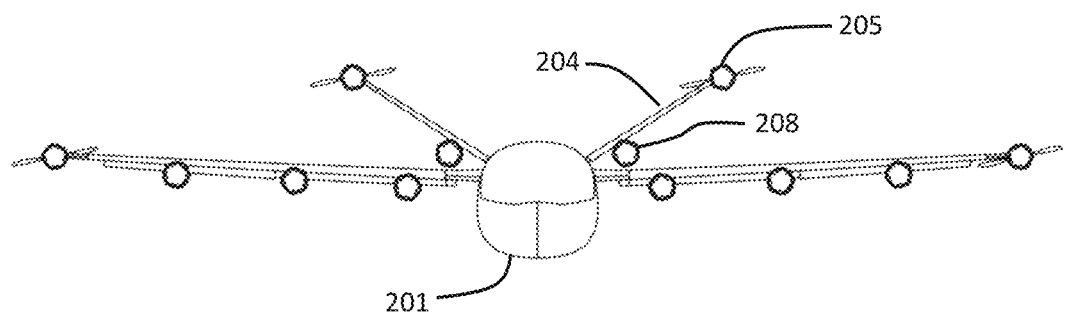
FIG. 34 is a front view of an aerial vehicle in a forward flight configuration according to a second embodiment of the present invention.
Figure 35:
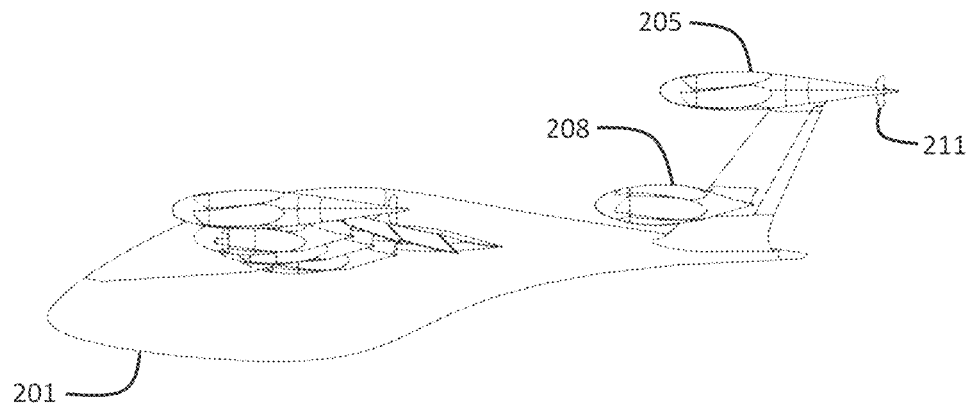
FIG. 35 is a side view of an aerial vehicle in a forward flight configuration according to a second embodiment of the present invention.
Figure 36:
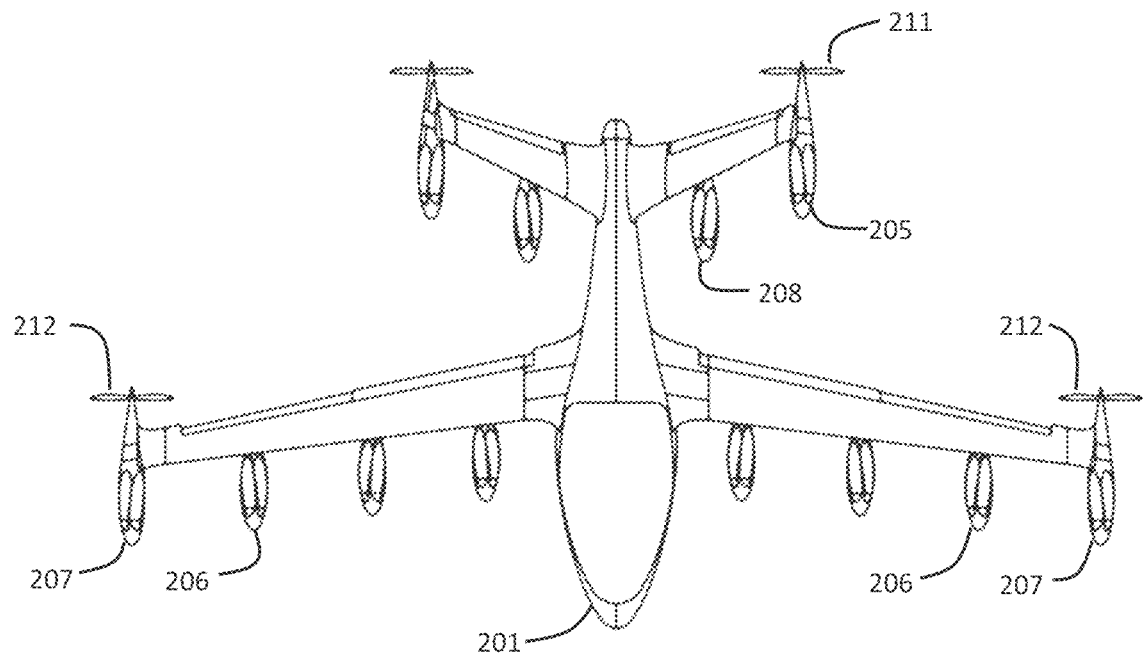
FIG. 36 is a top view of an aerial vehicle in a forward configuration according to a second embodiment of the present invention.
Figure 37:
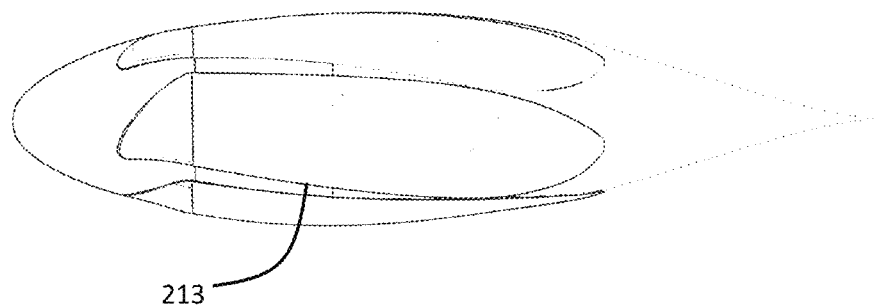
FIG. 37 is a side view illustrating nested blades according to some embodiments of the present invention.

As seen in top view in FIG. 32, the wings 202, 203 are swept forward. Aerial vehicles according to embodiments of the present invention may include partially or wholly forward swept wings with spanwise distributed masses located forward of the leading edge. The divergent aeroelastic torsion commonly seen in forward-swept wing designs is substantially reduced by the presence of the masses cantilevered forward of the wing, which create opposing torque. Also seen in the top view of FIG. 32 is that the propellers of the wing mounted motor driven rotor units are extended forward with, and from, their nacelles such that the air flow in vertical take-off mode is not substantially interfered with by the wings. Similarly, the propellers of the rear stabilizer mounted motor driven rotor units are extended forward with, and from, their nacelles such that the air flow in vertical take-off mode is not substantially interfered with by the rear stabilizers. An illustration of the linkage that may be used to extend the rotors in the vertical configuration may be seen in FIG. 38.

Another aspect of the forward swept wing configuration is that it allows for the wings 202, 203 to be mounted to the body 201 somewhat rearward of where they may have attached otherwise. The rearward attachment allows for a spar connecting the wings to traverse the interior of the aerial vehicle body to the rear of the passenger seats. A further aspect of the forward swept wing with articulating rotors in VTOL mode is the forward stagger of the vertical rotors, which improves longitudinal control authority in vertical and transitional flight for a given wing root location by lengthening the moment arm of these rotors about the center of gravity. This is especially helpful in the case of a failure in one of the rear mounted rotors during VTOL modes. Additionally, the more even longitudinal rotor distribution effected by this configuration reduces the highest torque of the motors required to maintain level vertical flight in worst-case single motor or rotor failure eventuality, allowing the motor size to be reduced.

In some aspects, a portion of the wing mounted rotors may be adapted to be used in a forward flight configuration, while other wing mounted rotors may be adapted to be fully stowed during regular, forward, flight. The aerial vehicle 200 may have four rotors on the right wing 203 and four rotors on the left wing 202. Three of the rotor assemblies on each wing may have wing mounted rotors 206 that are adapted to flip up into a deployed position for vertical take-off and landing, to be moved back towards a stowed position during transition to forward flight, and then to have their blades stowed, and nested, during forward flight. The fourth rotor assembly 207 may include a second set of blades to be used for forward flight, as discussed below. Similarly, the each rear stabilizer 204 may be have two rotor units mounted to it, both of which are adapted to be used during vertical take-off and landing, and transition, modes, but one of which is adapted to be fully stowed as low drag nacelle during forward flight.

A multi-modal wing mounted rotor unit 207 is adapted to use a first set of blades 212 for forward flight, and a second set of blades 213 for VTOL and transitional flight modes. The forward flight blades 212 may be coaxial to the VTOL blades 213, and may be attached at different ends of the same nacelle. In the case wherein the VTOL blades are articulated to a vertical position for VTOL flight modes, there may be two motors within the nacelle, one for each blade set. Similarly, a multi-modal rear mounted rotor unit 210 is adapted to use a first set of blades 211 for forward flight, and a second set of blades 214 for VTOL and transitional flight modes. The forward flight blades 211 may be coaxial to the VTOL blades 214, and may be attached at different ends of the same nacelle. In the case wherein the VTOL blades are articulated to a vertical position for VTOL flight modes, there may be two motors within the nacelle, one for each blade set.

In some aspects, all of the blades used to provide thrust for VTOL and transitional modes are stowed during forward flight, and different blades are used to provide thrust during forward flight. In some aspects, a single motor is used to provide power for different blade sets depending upon whether VTOL or forward flight modes are being used. In some aspects, two blade sets are placed in a coaxial configuration such that they are supported by a single nacelle, for example.

FIGS. 33-36 illustrate an aerial vehicle 200 in a forward flight mode wherein all of the VTOL blades have been stowed, and nested in recesses, such that the nacelles present low drag. In a forward flight mode, the wing mounted rotor units 206, 207 are seen with all of the VTOL blades stowed. Similarly, the rear mounted rotor units 205, 208 also have their VTOL blades stowed. The forward flight blade set 211 of the multi-modal rear rotor assemblies 205 and the forward flight blade set 212 of the multi-modal wing rotor assemblies 207 are used to provide thrust during forward flight.

Figure 39:
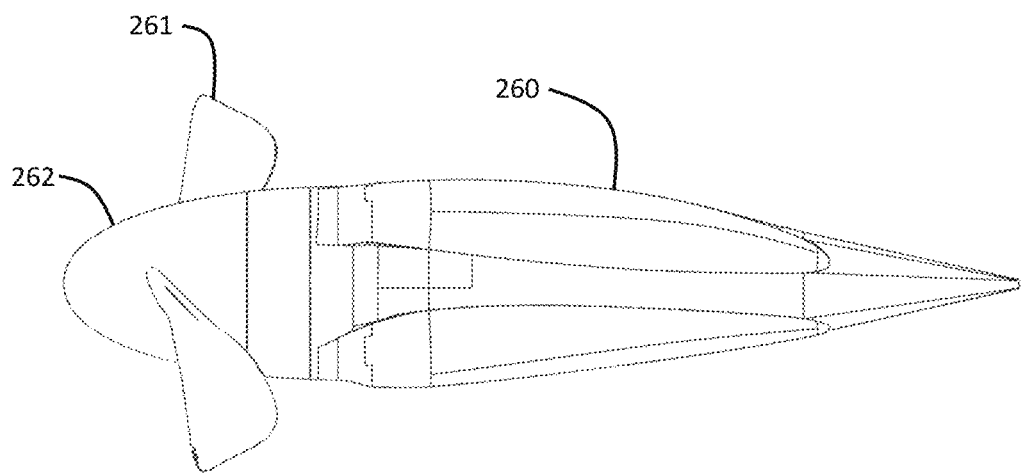
FIG. 39 is a side view of rotor unit with two blade sets in a forward flight mode according to some embodiments of the present invention.
Figure 40:
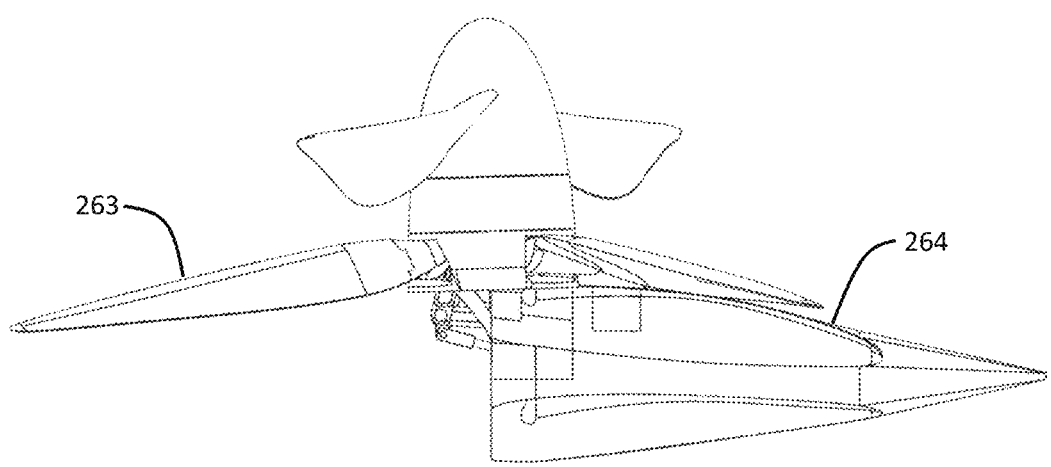
FIG. 40 is a side view of rotor unit with two blade sets in a take-off mode according to some embodiments of the present invention.
Figure 41:
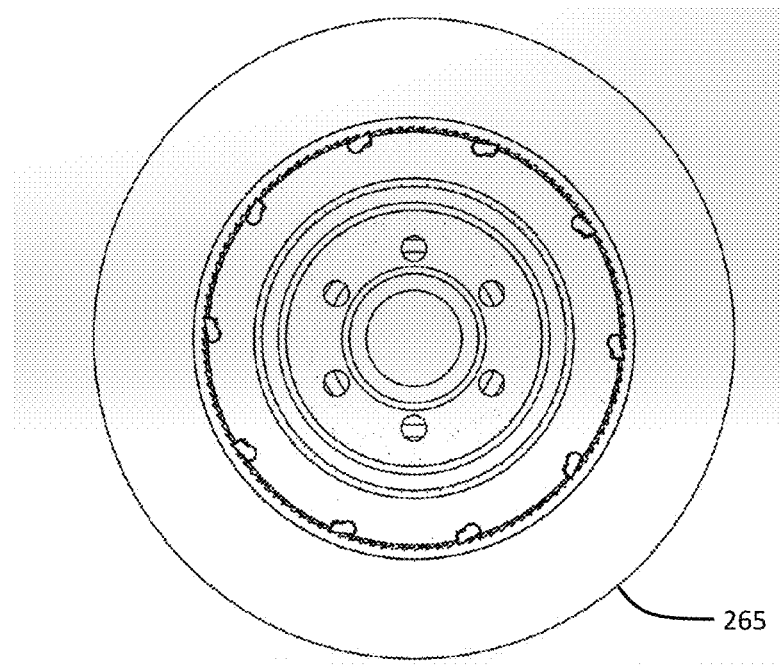
FIG. 41 is a front view of an electric motor according to some embodiments of the present invention.
Figure 42:
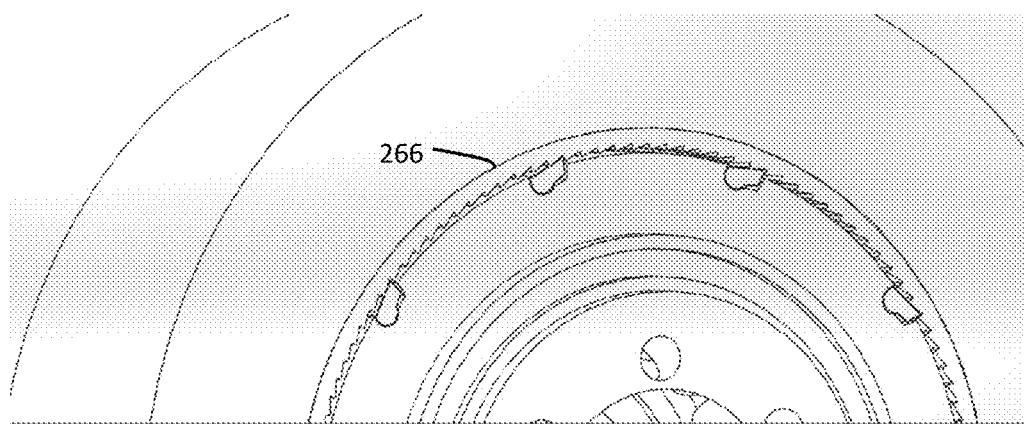
FIG. 42 is a partial view of a directional clutch in an electric motor according to some embodiments of the present invention.
Figure 43:
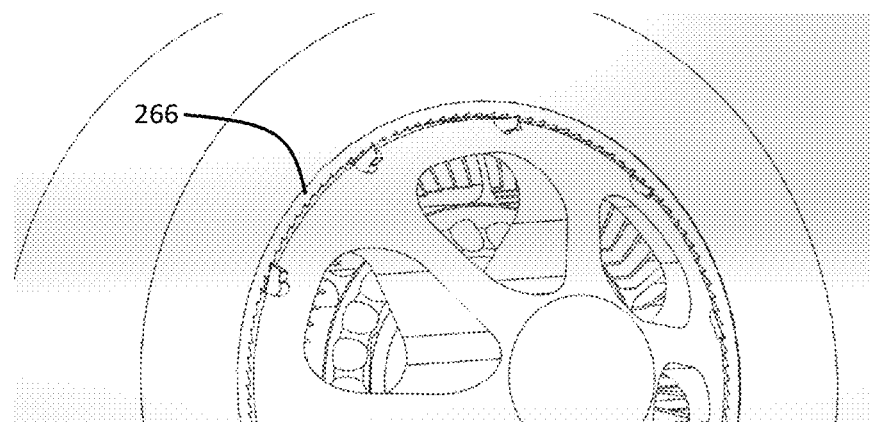
FIG. 43 is a partial view of a directional clutch in an electric motor according to some embodiments of the present invention.
Figure 44:
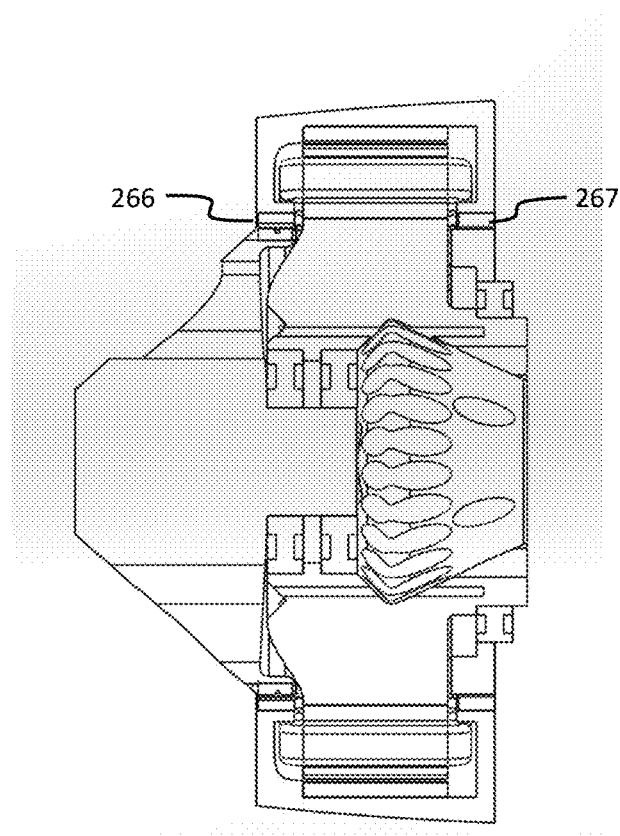
FIG. 44 is a partial cross-sectional view of directional clutches in an electric motor according to some embodiments of the present invention.
Figure 45:
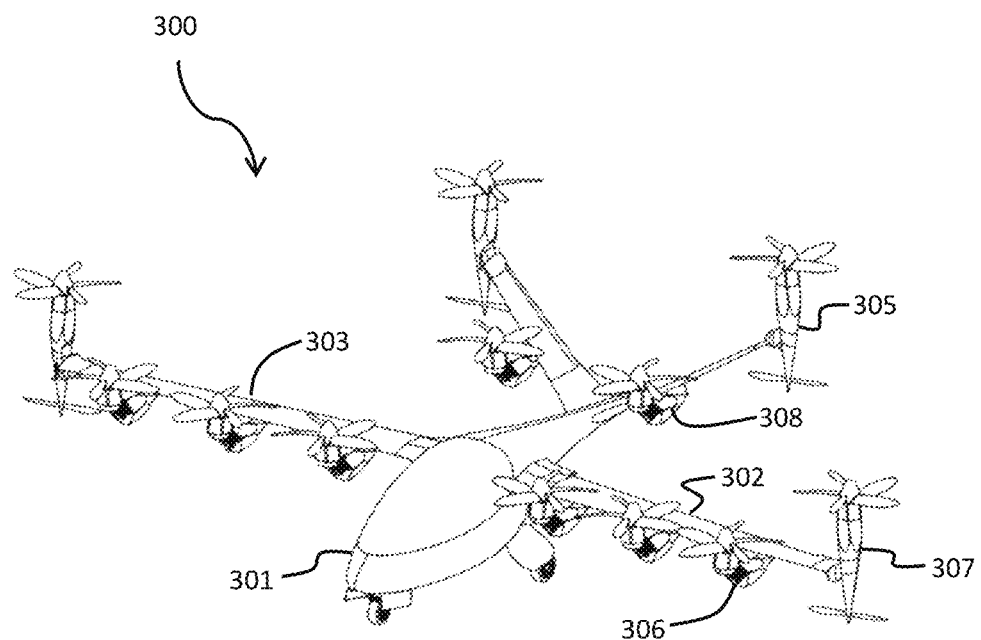
FIG. 45 is a perspective view of an aerial vehicle in take-off configuration according to a third embodiment of the present invention.
Figure 46:
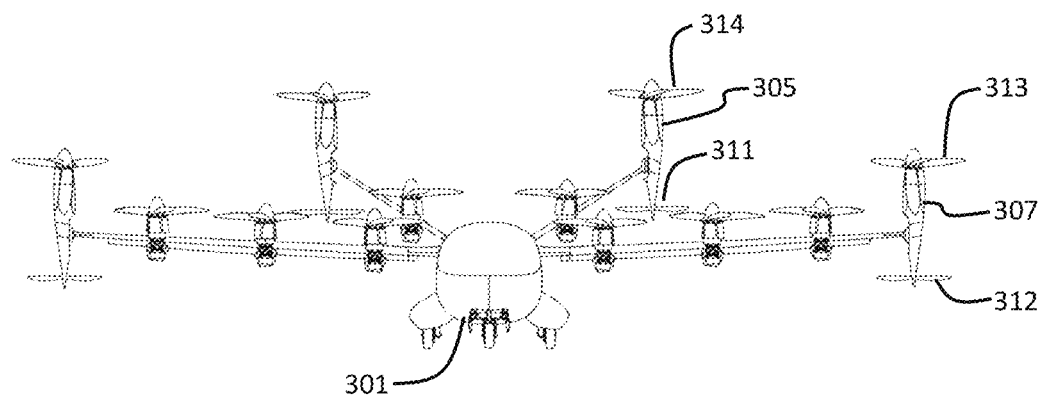
FIG. 46 is a front view of an aerial vehicle in take-off configuration according to a third embodiment of the present invention.
Figure 47:
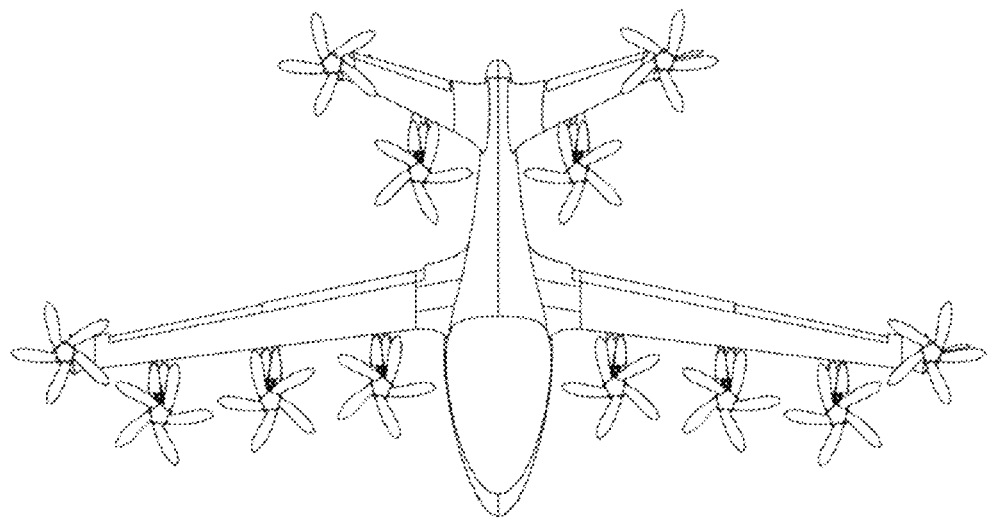
FIG. 47 is a top view of an aerial vehicle in take-off configuration according to a third embodiment of the present invention.
Figure 48:
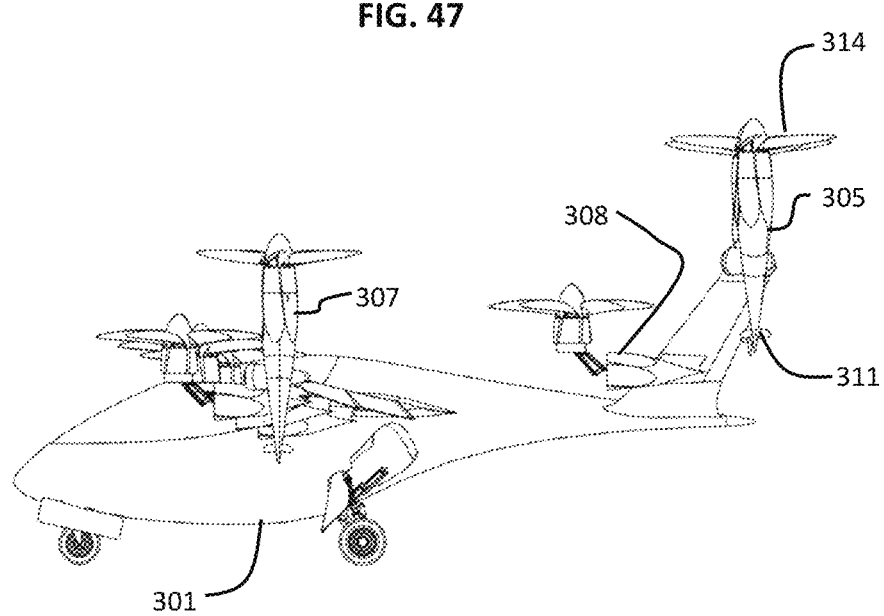
FIG. 48 is a side view of an aerial vehicle in take-off configuration according to a third embodiment of the present invention.
Figure 49:
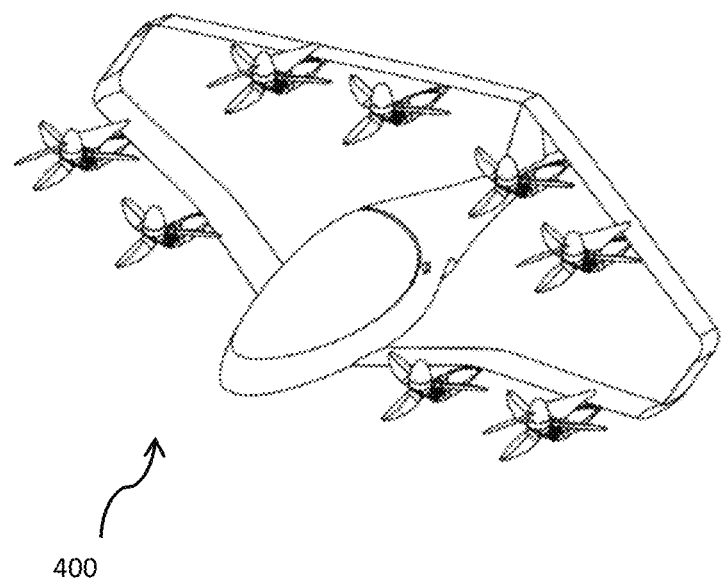
FIG. 49 is a perspective view of an aerial vehicle according to a fourth embodiment of the present invention.
Figure 50:
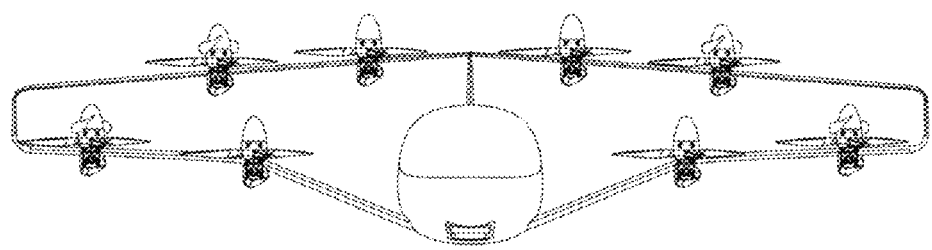
FIG. 50 is a front view of an aerial vehicle in a take-off configuration according to a fourth embodiment of the present invention.
Figure 51:
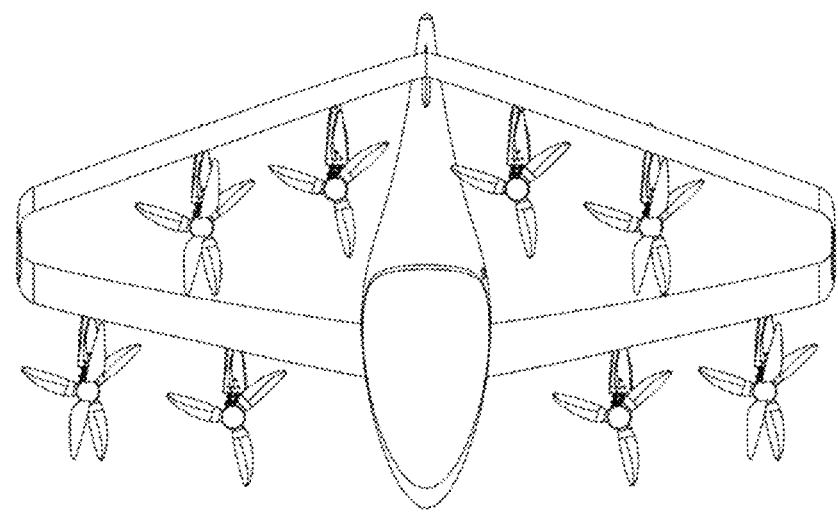
FIG. 51 is a top view of an aerial vehicle in a take-off configuration according to a fourth embodiment of the present invention.
Figure 52:
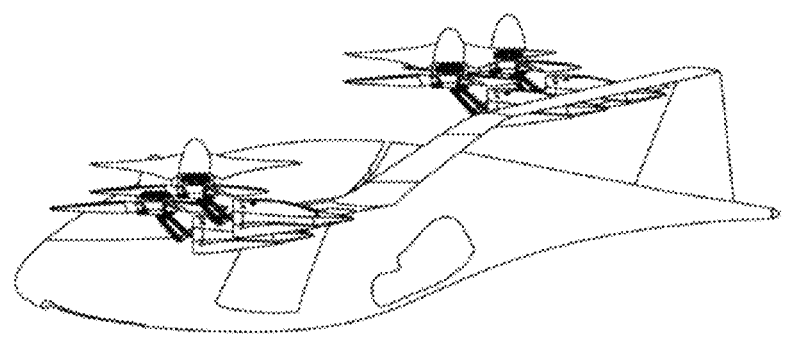
FIG. 52 is a side view of an aerial vehicle in a take-off configuration according to a fourth embodiment of the present invention.
Figure 53:
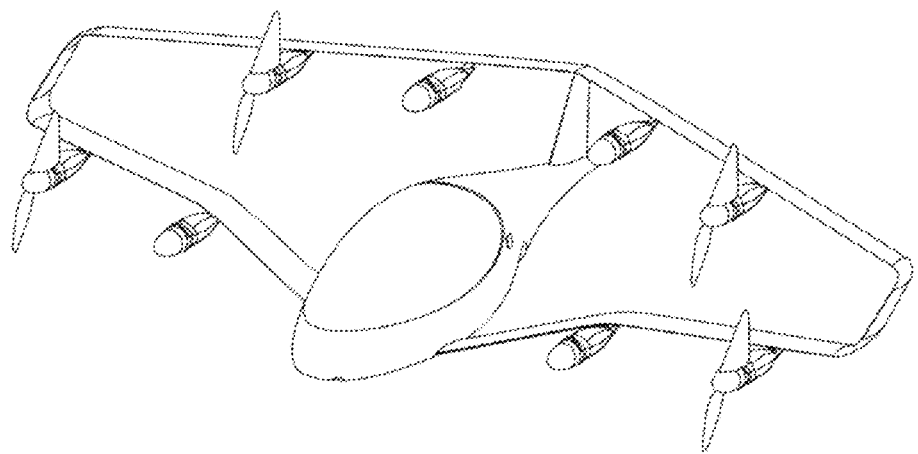
FIG. 53 is a perspective view of an aerial vehicle in a forward flight configuration according to a fourth embodiment of the present invention.
Figure 54:
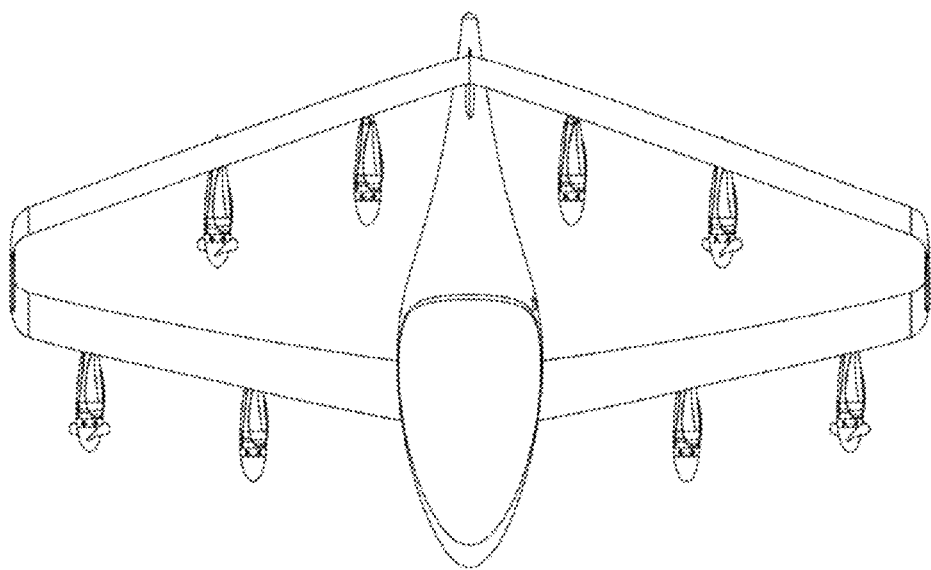
FIG. 54 is a top view of an aerial vehicle in a forward flight configuration according to a fourth embodiment of the present invention.
Figure 55:
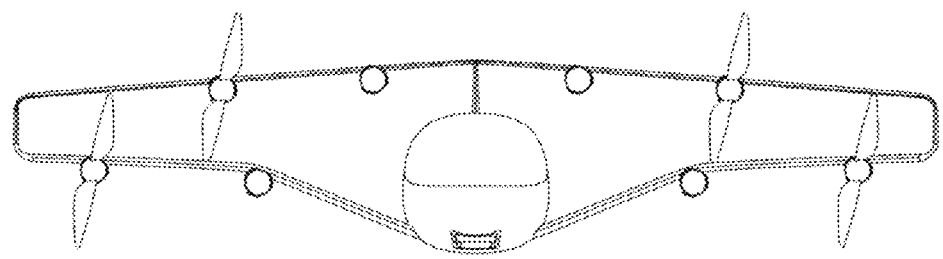
FIG. 55 is a front view of an aerial vehicle in a forward flight configuration according to a fourth embodiment of the present invention.
Figure 56:
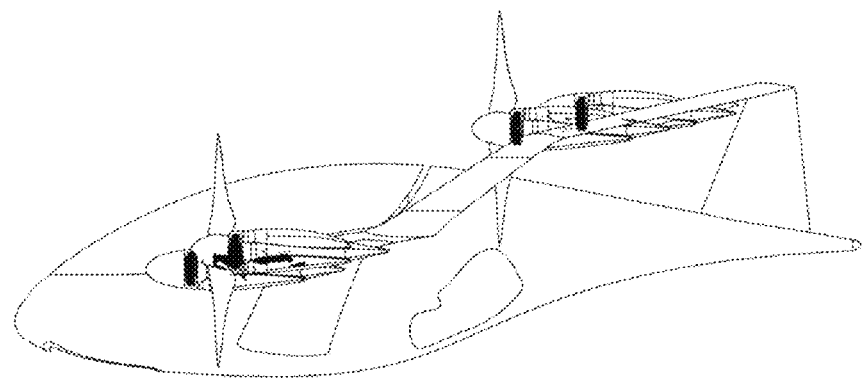
FIG. 56 is a side view of an aerial vehicle in a forward flight configuration according to a fourth embodiment of the present invention.

FIGS. 39 and 40 illustrate a motor and rotor unit 260 adapted to use a first set of blades 261 for a forward flight mode and a second set of blades 263 for VTOL and transition modes, in a coaxial configuration that shares a single motor for both blade sets. In this example, both blades are powered by the same electric motor. The electric motor may be adapted with directional clutches such that when the motor is rotated in a first direction the forward flight blades 261 are engaged, and the VTOL blades 263 are idled. During forward flight the VTOL blades 264 may stow and may nest in recesses 264. During VTOL and transition modes the motor may rotate in a second direction such that the VTOL blades 264 are engaged, and the forward flight blades 261 are disengaged. In the VTOL mode the motor and rotor assembly may be articulated such that the rotors and motor provide vertical thrust, with the entire motor and clutching unit, as well as both sets of blades, outboard of the positioning mechanism, such that no mechanical power related to blade thrust need traverse the gimbaled joint.

FIGS. 41-44 illustrate a motor 265 with directional clutches 266, 267 adapted to power a first set of blades when the motor is rotated in a first direction, and to power a second set of blades when the motor is rotated in a second direction. In some aspects, the VTOL blade set and the forward flight blade set may be oriented in different directions such that they both provide thrust in the same direction, although one set is engaged when the motor rotates in a first direction, and the second set is engaged when the motor rotates in a second direction.

In a third embodiment of the present invention, as seen in a vertical take-off configuration in FIGS. 45-48, an aerial vehicle 300 uses forward swept wings 302, 303 with rotors of different types adapted for both vertical take-off and landing and for forward flight. The aircraft body 301 supports a left wing 302 and a right wing 303. Motor driven rotor assemblies 306, 307 on the wings include propellers which may stow and nest into the nacelle body. The aircraft body 301 extends rearward and is also attached to raised rear stabilizers 304. The rear stabilizers have rear rotor assemblies 305, 308 attached thereto. The aerial vehicle 300 is adapted for two passenger seats side by side, as well as landing gear under the body 301.

The wing mounted rotor units 306, 307 are adapted to provide vertical thrust during take-off and landing modes. The inner rotor units 306 are adapted to deploy to a VTOL configuration using linkages as seen in FIG. 38. The blades of the inner wing rotor units 306 are adapted to stow when in a forward flight configuration, with the blades nested into recesses in the nacelle. The wing tip rotor units 307 are adapted to rotate relative to the wing such that the nacelle maintains its shape whether in a VTOL or a forward flight configuration. The VTOL blades 313 are used for VTOL and transition modes, and the forward flight blades 312 are used for forward flight, with the VTOL blades stowed and nested. The nacelle that maintains its shape allows for the use of a single motor to power either of the blade sets. The motor may use directional clutches such that the motor direction determines which of the blade sets is powered.

Similarly, the blades of the inner tail rotor units 308 are adapted to stow when in a forward flight configuration, with the blades nested into recesses in the nacelle. The rear tip rotor units 305 are adapted to rotate relative to the wing such that the nacelle maintains its shape whether in a VTOL or a forward flight configuration. The VTOL blades 314 are used for VTOL and transition modes, and the forward flight blades 311 are used for forward flight, with the VTOL blades stowed and nested.

In an exemplary configuration of the third embodiment, the aerial vehicle has 12 rotors and weighs 900 kg. The rotor diameter is 1.1 meters, with a thrust per rotor of 736 N. The continuous rpm of the motor at sea level is 1850 rpm, with a maximum of 2270 rpm. The wingspan is 8.9 meters. The battery mass is 320 kg, and the mass per motor is 9 kg. The cruise speed is 320 km/h. The continuous hover power per motor is 19 shaft kW.

FIGS. 49-52 illustrate a fourth embodiment of an aerial vehicle 400 in a take-off configuration. A box wing design is seen with the rotor assemblies deployed into vertical take-off configuration.

FIGS. 53-56 illustrate a fourth embodiment of an aerial vehicle 400 in a forward flight configuration. As seen the rotor assemblies are rotated into a forward flight configuration. Some of the blades of the rotor assemblies have been stowed to reduce drag in this forward flight mode.

In some aspects, aerial vehicles according to embodiments of the present invention take-off from the ground with vertical thrust from rotor assemblies that have deployed into a vertical configuration. As the aerial vehicle begins to gain altitude, the rotor assemblies may begin to be tilted forward in order to begin forward acceleration. As the aerial vehicle gains forward speed, airflow over the wings results in lift, such that the rotors become unnecessary for maintaining altitude using vertical thrust. Once the aerial vehicle has reached sufficient forward speed, some or all of the blades used for providing vertical thrust during take-off may be stowed along their nacelles. The nacelle supporting the rotor assemblies may have recesses such that the blades may nest into the recesses, greatly reducing the drag of the disengaged rotor assemblies.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. An aerial vehicle adapted for vertical take-off and horizontal flight, said aerial vehicle comprising:
    a main vehicle body;
    a plurality of electric motors;
    a right side wing, said right side wing comprising:
        one or more right wing rotor assemblies, each of said right wing rotor assemblies comprising:
        an electric motor;
        a VTOL propeller;
        a forward flight propeller; and
        a clutch, wherein said VTOL propeller is powered when said clutch operates in a first mode wherein the motor is rotated in a first direction, and wherein said forward flight propeller is powered when said clutch operates in a second mode wherein the motor is rotated in a second direction; and
    a left side wing, said left side wing comprising:
        one or more left wing rotor assemblies, each of said left wing rotor assemblies comprising:
        an electric motor;
        a VTOL propeller;
        a forward flight propeller; and
        a clutch, wherein said VTOL propeller is powered when said clutch operates in a first mode wherein the motor is rotated in a first direction, and wherein said forward flight propeller is powered when said clutch operates in a second mode wherein the motor is rotated in a second direction.

2. The aerial vehicle of claim 1 wherein said right side wing and said left side wing are partially forward swept wings.

3. The aerial vehicle of claim 1 wherein said right side wing and said left side wing are forward swept wings.

4. The aerial vehicle of claim 1 wherein said aerial vehicle is a tilt-wing aircraft, wherein said right side wing and said left side wing pivot from a vertical thrust configuration to a horizontal thrust forward flight configuration.

5. The aerial vehicle of claim 1 wherein the blades of said VTOL propellers of said right wing rotor assemblies and said left wing rotor assemblies are configured to stow.

6. The aerial vehicle of claim 4 wherein the forward flight propellers of said right wing rotor assemblies and said left wing rotor assemblies are forward of said VTOL propellers of said right wing rotor assemblies and said left wing rotor assemblies while in a forward flight configuration.

7. The aerial vehicle of claim 1 wherein said right wing rotor assemblies and said left wing rotor assemblies further comprise a clutch, wherein said VTOL propeller is powered when said clutch operates in a first mode, and wherein said forward flight propeller is powered when said clutch operates in a second mode.

8. The aerial vehicle of claim 7 wherein said right wing rotor assemblies and said left wing rotor assemblies are deployable from a vertical thrust configuration to a forward facing forward flight configuration.

9. The aerial vehicle of claim 1 wherein the forward flight propellers of said right wing rotor assemblies and said left wing rotor assemblies are rearward of said VTOL propellers of said right wing rotor assemblies and said left wing rotor assemblies while in a forward flight configuration.

* * * * *